United States Patent [19]

Stark

[11] 4,167,244

[45] Sep. 11, 1979

[54] GAS-CENTRIFUGE UNIT AND CENTRIFUGAL PROCESS FOR ISOTOPE SEPARATION

[75] Inventor: Thomas M. Stark, Morristown, N.J.

[73] Assignee: Exxon Nuclear Company, Inc., Bellevue, Wash.

[21] Appl. No.: 741,153

[22] Filed: Nov. 11, 1976

[51] Int. Cl.² .................... B04B 5/08; B01D 45/12
[52] U.S. Cl. .................... 233/18; 233/DIG. 1; 55/17
[58] Field of Search .................. 233/DIG. 1, 1 R, 11, 233/17, 18, 19 R, 19 A, 20 R, 27, 28, 15; 210/512 M; 55/17, 277

[56] References Cited

U.S. PATENT DOCUMENTS

| | | | |
|---|---|---|---|
| 2,779,537 | 1/1957 | Madany | 233/15 |
| 3,251,542 | 5/1966 | Newgard et al. | 233/11 |
| 3,281,067 | 10/1966 | Beyerle et al. | 233/27 |
| 3,309,016 | 3/1967 | O'Brien | 233/20 R |
| 3,902,658 | 9/1975 | Madsen | 233/18 X |

FOREIGN PATENT DOCUMENTS 876793  9/1961  United Kingdom .................... 233/18

Primary Examiner—George H. Krizmanich
Attorney, Agent, or Firm—Pennie & Edmonds

[57] ABSTRACT

An invention involving a process and apparatus for isotope-separation applications such as uranium-isotope enrichment is disclosed which employs cascades of gas centrifuges. A preferred apparatus relates to an isotope-enrichment unit which includes a first group of cascades of gas centrifuges and an auxiliary cascade. Each cascade has an input, a light-fraction output, and a heavy-fraction output for separating a gaseous-mixture feed including a compound of a light nuclear isotope and a compound of a heavy nuclear isotope into light and heavy fractions respectively enriched and depleted in the light isotope. The cascades of the first group have at least one enriching stage and at least one stripping stage. An example of such a gaseous mixture is uranium hexafluoride incorporating uranium-235 and uranium-238. The unit further includes means for introducing a gaseous-mixture feedstock into each input of the first group of cascades, means for withdrawing at least a portion of a product fraction from the light-fraction outputs of the first group of cascades, and means for withdrawing at least a portion of a waste fraction from the heavy-fraction outputs of the first group of cascades. The isotope-enrichment unit also includes a means for conveying a gaseous-mixture from a light-fraction output of a first cascade included in the first group to the input of the auxiliary cascade so that at least a portion of a light gaseous-mixture fraction produced by the first group of cascades is further separated into a light and a heavy fraction by the auxiliary cascade. At least a portion of a product fraction is withdrawn from the light fraction output of the auxiliary cascade. If the light-fraction output of the first cascade and the heavy-fraction output of the auxiliary cascade are reciprocal outputs, the concentration of the light isotope in the heavy fraction produced by the auxiliary cascade essentially equals the concentration of the light isotope in the gaseous-mixture feedstock.

50 Claims, 14 Drawing Figures

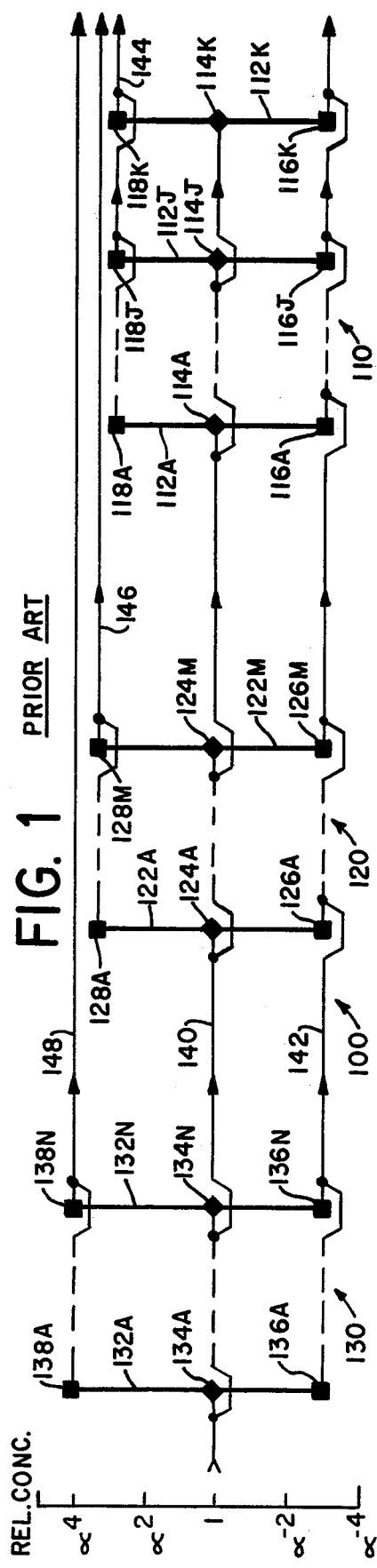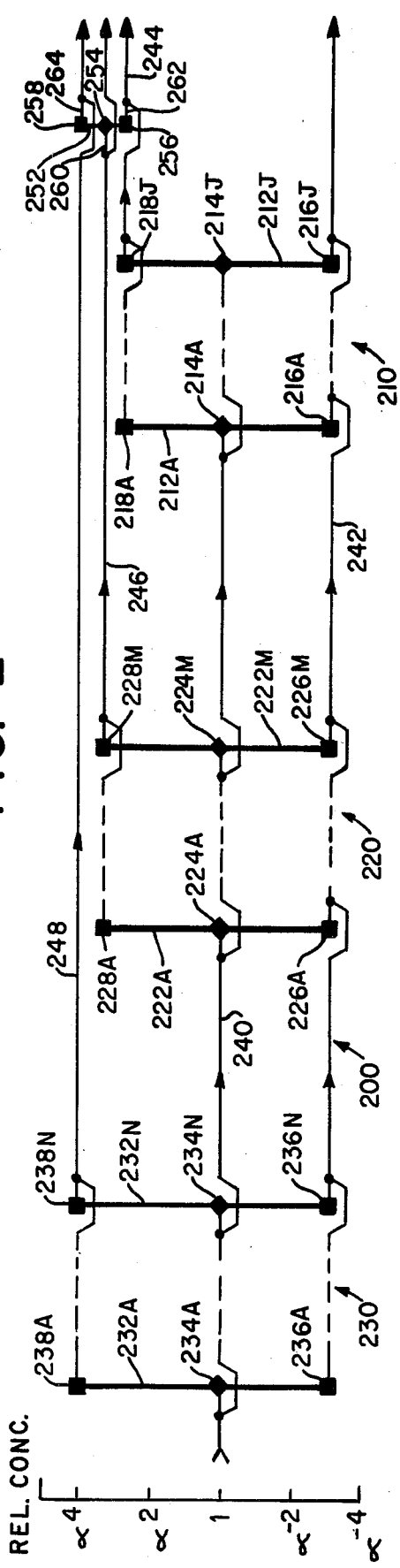

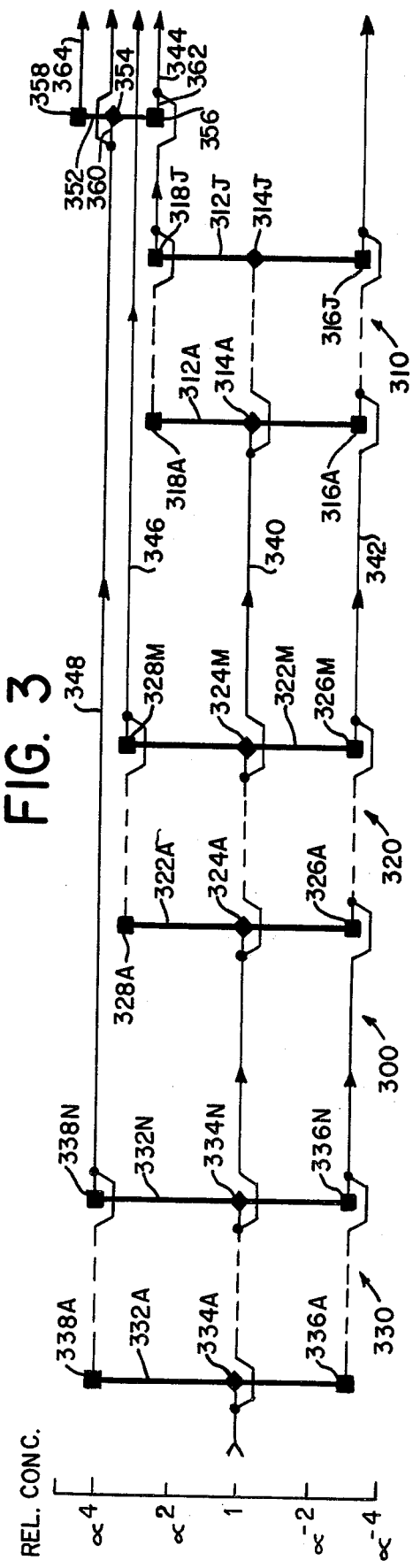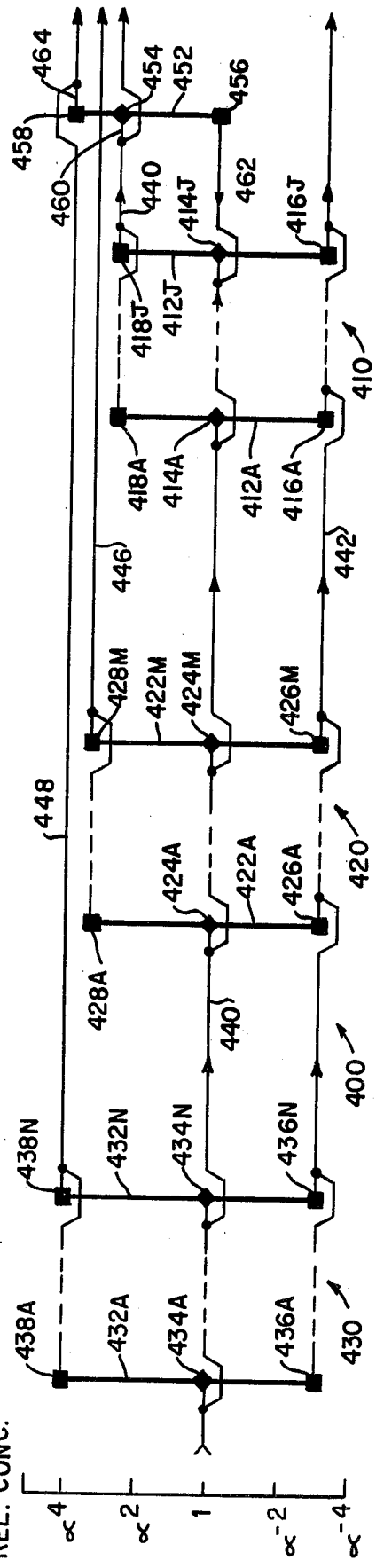

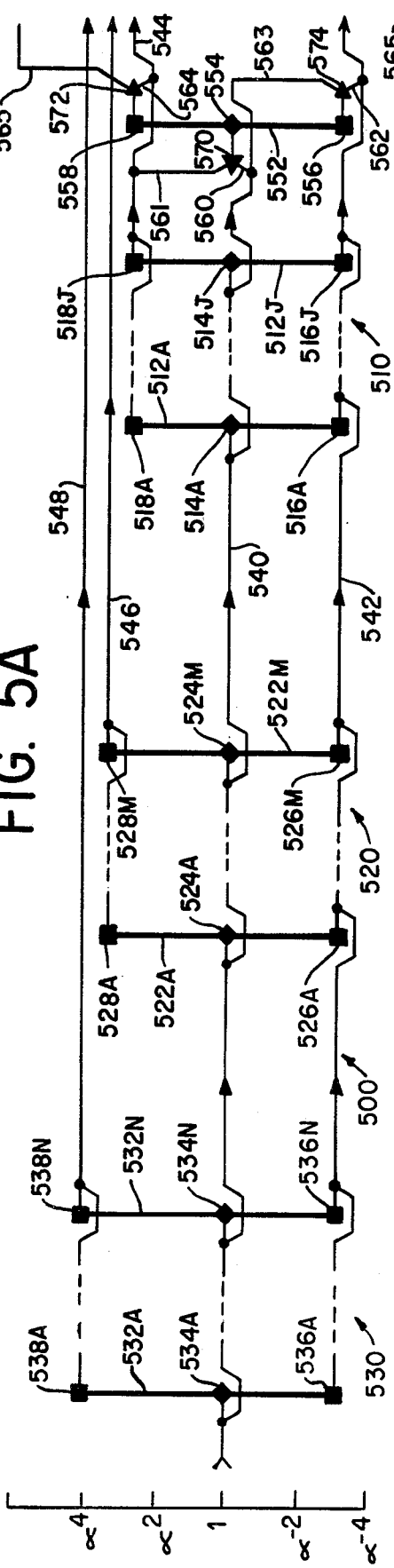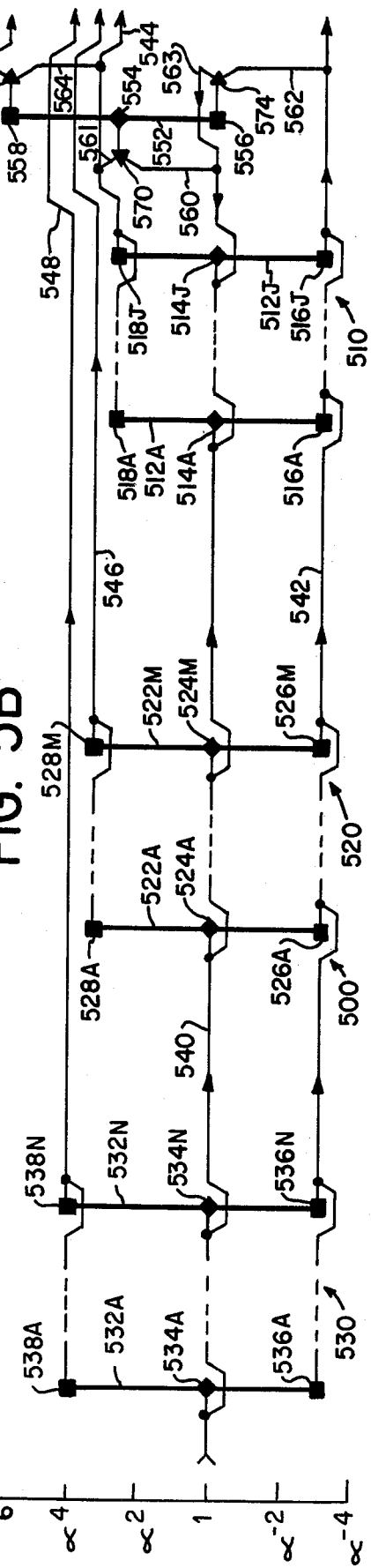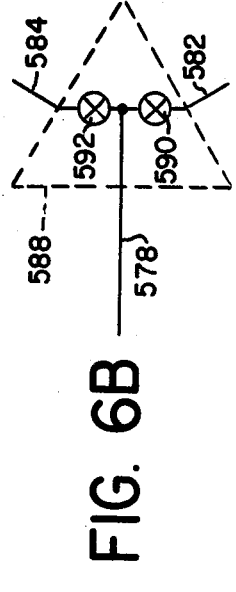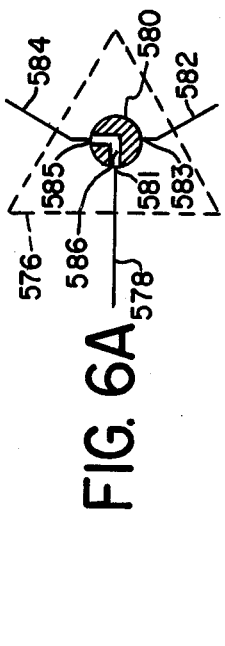

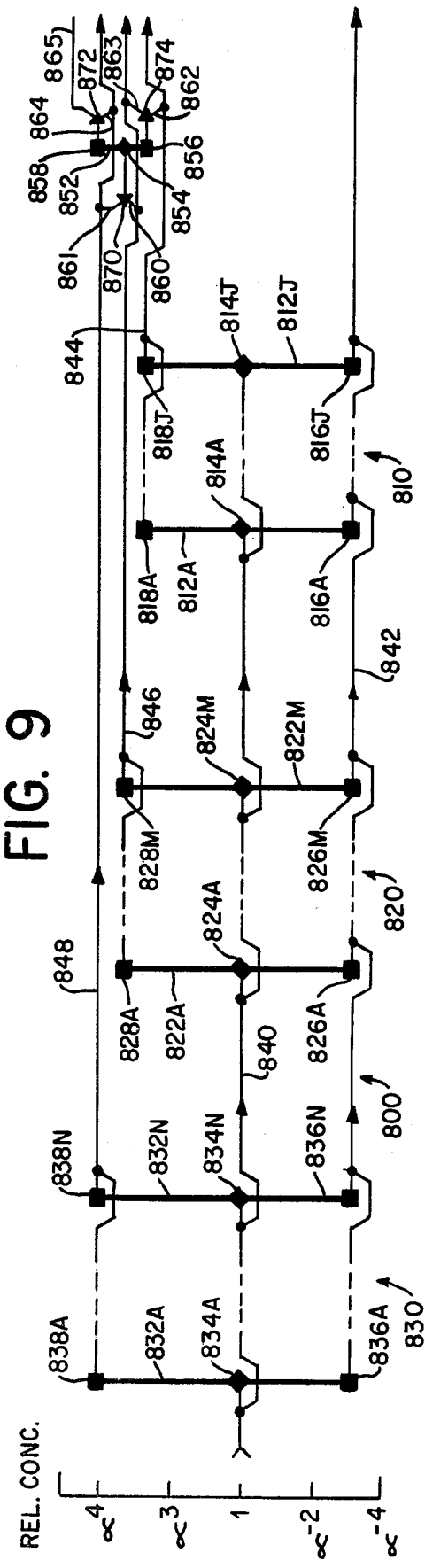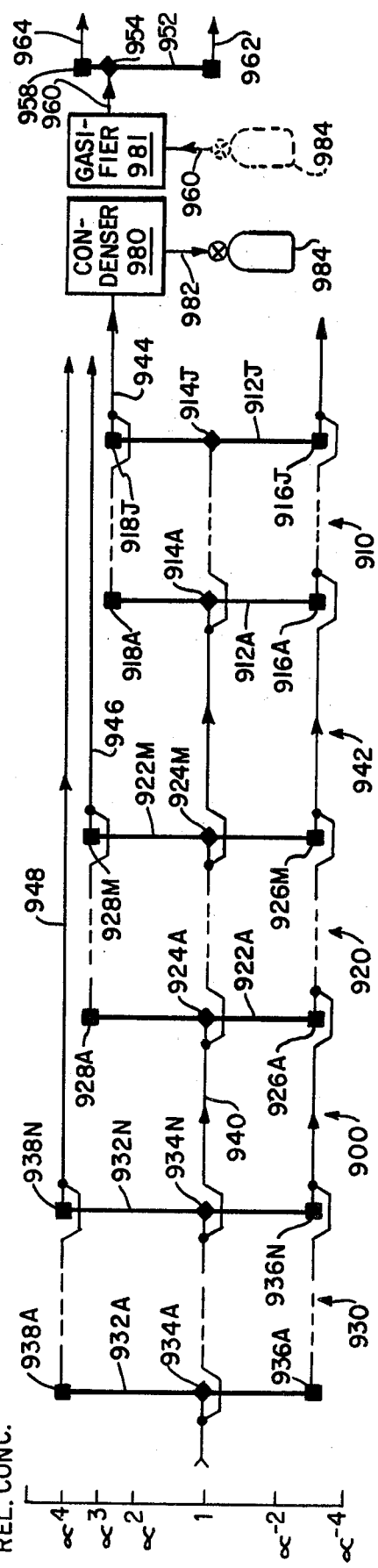

GAS-CENTRIFUGE UNIT AND CENTRIFUGAL PROCESS FOR ISOTOPE SEPARATION

FIELD OF THE INVENTION

The present invention is broadly related to the field of isotope separation by gas centrifugation. Preferred embodiments of the present invention may be used to enrich the uranium-235 concentration in gaseous uranium hexafluoride.

BACKGROUND OF THE INVENTION

The separation of two nuclear isotopes which differ slightly in mass, such as uranium-235 and uranium-238, generally requires expensive equipment and great amounts of energy. Although gas-centrifugation processes for producing uranium hexafluoride ($UF_6$) enriched in uranium-235 for nuclear reactor fuels promise to require substantially less energy than gaseous-diffusion processes in present use, the energy requirements for a commercial gas-centrifuge uranium-enrichment facility are nonetheless enormous. Gas centrifuge isotope-enrichment plants are therefore designed to operate as efficiently as possible to minimize the cost of energy consumption. A second significant economic factor is the cost of the plant itself. Gas-centrifuge plants are therefore designed to require as little equipment as practical, consistent with the need for safe operation.

A gas centrifuge for enriching uranium generally has an input into which gaseous uranium hexafluoride is introduced, a light-fraction output out of which a light fraction enriched in $^{235}UF_6$ is withdrawn, and a heavy-fraction output out of which a heavy fraction depleted in $^{235}UF_6$ is withdrawn. One aspect of the performance of such a gas centrifuge is measured by the separation factor $\alpha$, which is defined by the following formula:

$$\alpha = \frac{X_L}{1 - X_L} \cdot \frac{1 - X_H}{X_H},$$

where $X_L$ is the mole fraction of $^{235}UF_6$ in the light fraction and $X_H$ is the mole fractions of $^{235}UF_6$ in the heavy fraction. When the mole fractions $X_L$ and $X_H$ are much less than 1, as is the case where uranium hexafluoride containing 3 mole percent or so of $^{235}UF_6$ for enriched-uranium reactors for electric power generation is being produced, $\alpha$ approximately equals the ratio of the mole fraction of $^{235}UF_6$ in the light fraction to the mole fraction of $^{235}UF_6$ in the heavy fraction. The value of $\alpha$ for a particular gas centrifuge depends both on the design of the centrifuge and the conditions under which it is operated.

Typically the separation factors of present-day gas centrifuges under ordinary operating conditions are too low to permit natural-abundance uranium hexafluoride in a single pass through a gas centrifuge to be enriched in uranium-235 sufficiently for use as a fuel in an enriched-uranium reactor. However if a number of gas centrifuges are connected in series so that an output of one centrifuge feeds an input of another, it is possible to enrich uranium hexafluoride progressively to the concentrations of uranium-235 required by such reactors. Thus gas centrifuges for use in producing enriched uranium are ordinarily interconnected to form what are termed *cascades*. A cascade includes one or more *stages* of gas centrifuges, the term stage referring to a group of gas centrifuges connected in parallel. Pressure and flow regulators are used to control the flow of uranium hexafluoride among the stages and gas centrifuges. Cascade designs for commercial uranium enrichment plants often incorporate hundreds or even thousands of gas centrifuges. Generally the stages of a cascade are interconnected so that each input of a stage is supplied with uranium hexafluoride from heavy-fraction outputs of stages above it and from light-fraction outputs of stages below it. Thus uranium hexafluoride passing "upward" through a cascade becomes progressively enriched in uranium-235 while uranium hexafluoride passing "downward" becomes progressively depleted in uranium-235. The stages of a cascade are generally divided into two groups, termed *enriching stages* and *stripping stages*, an enriching stage being one into which a feedstock is introduced or located higher in the cascade. As used herein, the term cascade can refer to a single stage. The stage of a single-stage cascade would be termed an enriching stage according to the above definition since feedstock is introduced into it.

Since it is costly to enrich the uranium-235 concentration in uranium hexafluoride, mixing two streams of uranium hexafluoride having different degrees of enrichment represents an expense. Cascades are thus ordinarily designed to minimize any such mixing losses in the operation of the cascade. Specific designs of such no-mix cascades for interconnecting various types of gas centrifuges are well known in the art and for conciseness will not be described here. See, for example, H. R. Pratt, *Countercurrent Separation Process*, Elsevier Publishing Co., New york (1967). It will be noted, however, that considerations concerning the economics of operating a cascade imply that cascades for enriching natural abundance uranium preferably include several stripping stages. Thus, in addition to producing a product fraction enriched in uranium-235 to the degree needed for reactor fuel, cascades of gas centrifuges for enriching natural-abundance uranium hexafluoride also generally produces a waste fraction depleted in $^{235}UF_6$ to a predetermined concentration, typically about 0.02–0.35 mole percent.

A commercial uranium-enrichment facility must provide uranium enriched in uranium-235 to varying degrees since different reactors require fuels having significantly different concentrations of uranium-235. Thus a gas-centrifuge plant would normally include a number of cascades, the cascades having different numbers of enriching stages so that products of different concentrations are produced when the cascades are supplied with natural-abundance uranium hexafluoride.

FIG. 1 depicts a schematic flow graph of a representative prior-art isotope-enrichment unit 100 for enriching natural-abundance uranium hexafluoride. The isotope-enrichment unit 100 will be described in detail to illustrate the flow graph of FIG. 1, since this type of flow graph is employed in connection with various preferred embodiments of the present invention disclosed below. The heavy vertical ines of FIG. 1 represent cascades of gas centrifuges, with filled-in diamonds representing inputs to the cascades and filled-in squares representing outputs. Thus a cascade 112A has an input 114A, a heavy-fraction output 116A, and a light-fraction output 118A. The input 114A of the cascade 112A is connected to a feedstock supply line 140. The heavy-fraction output 116A is connected to a waste-fraction discharge line 142 and the light-fraction output 118A is connected to a first product-fraction discharge line 114.

Connected in parallel with the cascade 112A are other operationally-equivalent cascades such as cascades 112J and 112K to form a first subunit 110. An input 114J of the cascade 112J is connected to the feed-stock supply line 140. The heavy-fraction and light-fraction outputs 116J and 118J are respectively connected to the waste-fraction and first product-fraction discharge lines 142 and 144. The cascade 112K and other cascades included in group 110 but not shown in FIG. 1 are connected to the supply line 140 and the discharge lines 142 and 144 in the same manner as the cascades 112A and 112J.

The vertical axis of the flow graph of FIG. 1 represents the concentration of $^{235}UF_6$ relative to the concentration of $^{235}UF_6$ in the feedstock in a logarithmic scale to a base equal to the separation factor $\alpha$. The drawings of this application are based on gas centrifuges having a separation factor of 1.5. Although the separation factor of a gas centrifuge typically varies somewhat with its position within a cascade, such variations are ordinarily sufficiently small as to be negligible in the context of understanding the present invention. Referring to the vertical coordinate of the light-fraction outputs 118A–118K and the light-fraction discharge line 144 in FIG. 1, it may be seen that the cascades of the first subunit 110 produce a product fraction enriched in uranium-235 relative to the feedstock ideally by a factor of $\alpha^3$. For a separation factor $\alpha$ of 1.5 this corresponds to a $^{235}UF_6$ concentration of about 2.40 mole percent. The cascades of the first subunit 110 also produce a waste fraction depleted in uranium-235 ideally by a factor of $\alpha^{-3}$, as may be read from the vertical axis of FIG. 1, which corresponds to a $^{235}UF_6$ concentration of about 0.21 mole percent. One cascade design which is termed in the prior art a one-up/one-down countercurrent cascade can accomplish isotope enrichment and depletion by these factors with six stages of gas centrifuges with separation factors equal to $\alpha$ in the enriching section and five such stages in the stripping section. Other cascade designs may require different numbers of stages in the two sections.

The isotope enrichment unit 100 also includes a second subunit of cascades 120 and a third subunit 130. Included in the second subunit 120 are cascades 122A–122M which have respectively inputs 124A–124M, heavy-fraction outputs 126A–126M, and light-fraction outputs 128A–128M. The inputs 124A–124M are connected to the feedstock supply line 140 and the waste fraction outputs 126A–126M are connected to the waste fraction discharge line 142. The light fraction outputs 128A–128M are connected to a second product discharge line 146. The cascades of the second group 120 ideally produce a product fraction enriched in uranium-235 by a factor of $\alpha^{3.5}$ and a waste fraction depleted in that isotope by $\alpha^{-3}$. Similarly the third subunit 130 produces a product fraction enriched in uranium-235 by a factor of $\alpha^4$ and a waste fraction having substantially the same concentration as the waste fractions produced by the first and second subunits 110 and 120. The cascades 132A–132N of the third subunit have inputs 134A–134N connected to the feedstock supply line 140, heavy-fraction otuputs 136A–135N are connected to the waste discharge line 142 and the light fraction outputs 138A–138N are connected to a third product discharge line 148.

The cascades of the three subunits have the same number of stripping stages and thus ideally all produce a heavy fraction of the same concentration of uranium-235. Combining the waste fractions produced by the three subunits therefore does not give rise to any significant mixing losses. The three groups of cascades differ, however, in the number of enriching stages. For the one-up/one-down countercurrent cascade design referred to above, cascades of the first, second, and third subunits would all have five stripping stages, but would have respectively six, seven, and eight enriching stages. Thus the isotope-enrichment unit 100 when supplied with natural-abundance uranium hexafluoride on feedstock supply line 140 produces one waste fraction which is withdrawn over the waste discharge line 142 and three product fractions of enriched uranium which are withdrawn over the first, second and third product discharge lines 144, 146, and 148. The rate at which a given product fraction is produced by the isotope-enrichment unit 100 depends on the number and individual capacity of the cascades in the corresponding subunit.

Not only are reactor fuels of different concentrations of uranium-235 required at any given time, but as time goes on the demand profile for fuels enriched to different degrees is likely to change. The changing demand profile for reactor fuels in part results from the fact that nuclear reactors generally require fuels of higher concentrations of uranium-235 for reloading than for starting up. Thus, if, as is likely to be the case, the customers of a new uranium enrichment plant are primarily new nuclear power plants, than the demand profile will shift in time towards higher average concentrations of uranium-235. In addition, reactor designs can be expected to continue to evolve, which leads to changes in the demand profile as new reactors are built.

The changing demand profile for enriched uranium presents a serious problem in designing a uranium-enrichment facility. One way to provide the capability of meeting changes in the demand profile is to have the facility produce a wide spectrum of product fractions of different concentrations of uranium-235 by having numerous subunits of cascades with varying numbers of enriching stages. Uranium hexafluoride of particular concentrations could be made by blending product fractions and changes in the demand profile could be met by adjusting the product blends. However, as noted earlier, such blending is wasteful since isotope separation is such an expensive process. Moreover the average concentration of uranium-235 in the enriched-uranium products of such a plant can only be decreased by blending, and then only by mixing one or more product fractions with natural-abundance uranium or the waste fraction, which in either case results in extremely high mixing losses.

A second way to change the concentrations of products of a uranium enrichment plant which can reduce the problems of mixing losses inherent in blending is to redistribute cascades among the various subunits of the plant by "repiping" some of the cascades to change the number of stages in their enriching sections. To increase the average concentration of $^{235}UF_6$ in the enriched product, for example, a number of the cascades from a subunit having few enriching stages could be repiped into cascades having more enriching stages. Changing even by only one the number of enriching stages for most cascade designs, however, requires changing the number of gas centrifuges in each stage and altering the flow rates of uranium hexafluoride between all of the stages. Thus repiping a large cascade is a major undertaking which involves extended down time and considerable expense. The difficulties which attend repiping a cascade are compounded when the cascade has been handling radioactive material. Moreover, if a commercial gas centrifuge plant is to meet by redistributing cascades among subunits a shift in the product demand profile which stems from supplying a group of reactors of which at one time only 40% require fuel for reloading, but of which 90% require fuel for reloading three years later, then about 27% of the cascades in the plant must be repiped. Repiping over a quarter of the cascades in a gas centrifuge plant after they have handled radioactive uranium hexafluoride is an undertaking comparable in scale to interconnecting all of the gas centrifuges of the plant initially.

SUMMARY OF THE INVENTION

I have invented a gas-centrifuge isotope enrichment unit which can be operated without significant mixing losses and whose distribution of products can be changed quickly and relatively inexpensively to meet changes in the demand profile.

More particularly, the present invention relates to an isotope enrichment unit for separating a gaseous-mixture feedstock including a compound of a light nuclear isotope at a predetermined concentration and a compound of a heavy nuclear isotope at a predetermined concentration into at least two unit output fractions. One of the unit output fractions is a waste fraction depleted in the light isotope to a predetermined concentration and another is a product fraction enriched in the light isotope to a predetermined concentration. The isotope enrichment unit includes a first group of cascades of gas centrifuges. Each cascade in the first group has at least one enriching stage and at least one stripping stage as well as an input, a light-fraction output, and a heavy-fraction output. These cascades are capable of separating the gaseous-mixture feedstock into light and heavy gaseous-mixture fractions. The isotope enrichment unit further includes means for introducing the gaseous-mixture feedstock into each input of the first group of cascades. It also includes means for withdrawing at least a portion of a product fraction and a waste fraction respectively from the light-fraction and heavy-fraction outputs of the first group of cascades. The isotope enrichment unit further comprises an auxiliary cascade having an input, a light-fraction output, and a heavy-fraction output. The auxiliary cascade can have a plurality of enriching and stripping stages or can be a single-stage cascade. So that at least a portion of a gaseous-mixture fraction produced by the first group of cascades can be further separated into a light fraction and a heavy fraction by the auxiliary cascade, the isotope enrichment unit further includes means for conveying a gaseous-mixture fraction from an output of a first cascade included in the first group to the input of the auxiliary cascade. The means for conveying the gaseous-mixture fraction can be, for example, simply a conduit and a flow regulator connected between the output of the first cascade and the input of the auxiliary cascade. For certain batch process applications it may be preferred to employ a container which is detachably connectable to the output of the first cascade for condensing the gaseous-mixture fraction into the container, and also detachably connectable to the input of the auxiliary cascade for evaporating the gaseous-mixture fraction from the container. The isotope-enrichment unit also includes means for withdrawing at least a portion of a unit output fraction from an output of the auxiliary cascade.

In a preferred embodiment of the present invention a light or heavy fraction produced by the auxiliary cascade ideally has the same concentration of light isotope as the gaseous-mixture feedstock. I term herein a light-fraction output of a first cascade and a heavy-fraction output of a second cascade *reciprocal outputs* if the number of enriching and stripping stages in the two cascades are such that when light fraction from the output of the first cascade is supplied to the second cascade as a feed, the heavy fraction from the output of the second cascade has substantially the same mole fraction of light isotope as the feed supplied to the first cascade. For two conventional one-up/one-down cascades, the light-fraction output of one cascade and the heavy-fraction output of the other are reciprocal outputs if the number of stripping stages of the latter cascade equals the number of enriching stages minus one of the former. Thus in one preferred embodiment of the present invention, the heavy-fraction output of the auxiliary cascade and at least one light-fraction output of one or more first cascades included in the first group of cascades are reciprocal outputs, and the auxiliary cascade is supplied with feed from such light fraction outputs. The heavy fraction produced by the auxiliary cascade can thus be combined with the gaseous-mixture feedstock and recycled to the first group of cascades without suffering significant mixing losses. The average concentration of the light isotope in the product fractions produced by this embodiment is significantly greater than the average concentration of the light isotope in the product fractions from a corresponding conventional isotope-enrichment unit which has a first group of cascades identical to the first group of the preferred embodiment and has one additional cascade which is connected in parallel with a cascade of the first group, the additional cascade having the same number of gas centrifuges as the auxiliary cascade of the preferred embodiment. Conventional isotope-enrichment units can thus be converted to this preferred embodiment in order to meet a shift in the product demand profile towards significantly increased average concentration of light isotope.

A feature of the present invention is that changes in the distribution of products from an isotope-enrichment unit can be accomplished without significantly affecting the mixing losses of the unit and without redistributing a large fraction of cascades among subunits. For example, repiping only a few percent of the cascades of a conventional isotope-enrichment unit to convert it to an isotope-enrichment unit of the present invention can change the distribution of the product fractions to approximately the same extent as repiping over twenty-five percent of the cascades of the conventional unit to redistribute them among its subunits. Repiping a relatively few cascades to make an isotope-enrichment unit of the present invention can thus be an economically-attractive strategy for meeting changes in the product demand profile, particularly unanticipated changes.

If shifts in the product demand profile can be predicted in advance, then it may be preferable to use embodiments of the present invention which include valves to enable one or more cascades to be "swung" between two or more alternative modes of operation to change the product distribution economically without having to repipe any cascades. Thus in a preferred embodiment of the present invention, valve means and conduits are included for alternately connecting the input of the auxiliary cascade to one of two sources of gaseous-mixture feed. For example, one source might be the means for introducing the gaseous-mixture feedstock into the inputs of the first group of cascades and the other source a light-fraction discharge line of a subunit of the first group. Alternatively, the input of the auxiliary cascade might be swung between the light-fraction discharge lines of two different subunits which produce light fractions of different compositions. In either embodiment, the auxiliary cascade can be operated in one of two modes, the concentrations of the light isotope in the light and heavy fractions produced by the auxiliary cascade in the two modes being different. In this way the concentration of product fractions can be changed conveniently to meet changes in the product demand profile by simply swinging valves, thereby avoiding the trouble of repiping any cascades which have handled radioactive materials.

An additional feature of the present invention is that a large variety of cascade and gas centrifuge designs can be used to make the present isotope-enrichment unit. Thus in addition to the conventional one-up/one-down cascade design referred to above, the present isotope-enrichment unit may employ other less conventional cascade designs such as, for example, the two-up/one-down cascade described by D. R. Olander in "Nuclear Technology," vol. 29, pp. 108–112 (April 1976). It will of course generally be preferred to use cascade designs which minimize costs by operating most efficiently and requiring the fewest gas centrifuges to process feedstock at a given rate. Similarly it will ordinarily be preferred to use gas centrifuges of the most economical design for the present invention. The engineering details of cascade and gas centrifuge designs are not required to understand or appreciate the present invention and, for conciseness, are not discussed herein.

BRIEF DESCRIPTION OF THE DRAWINGS

The present invention may be better appreciated if reference is made to the following drawings.

FIG. 1 is a flow graph of a representative prior-art isotope-enrichment unit described above.

FIG. 2 is a flow graph of a first embodiment of the isotope-enrichment unit of the present invention for producing three product fractions of different compositions. This embodiment includes a single-stage auxiliary cascade.

FIG. 3 is a flow graph of a second embodiment of the present invention for producing four product fractions.

FIG. 4 is a flow graph of a third embodiment of the present invention for producing three product fractions.

FIGS. 5A and 5B are flow graphs of a fourth embodiment of the present invention shown in alternate modes of operation. If operated in the mode depicted in FIG. 5A, this embodiment produces three different product fractions. If operated in the mode of FIG. 5B, it produces four product fractions.

FIGS. 6A and 6B depict alternate embodiments of valve means employed in the embodiment of FIGS. 5A and 5B.

FIG. 9 is a flow graph of a seventh embodiment which has two modes of operation, only one of which is shown.

FIG. 10 is a flow graph and schematic drawing of an eighth embodiment of the present invention which employs an alternate means for conveying a gaseous-mixture fraction from a subunit of cascades to an auxiliary cascade.

DETAILED DESCRIPTION OF PREFERRED EMBODIMENTS

Figure 2A:
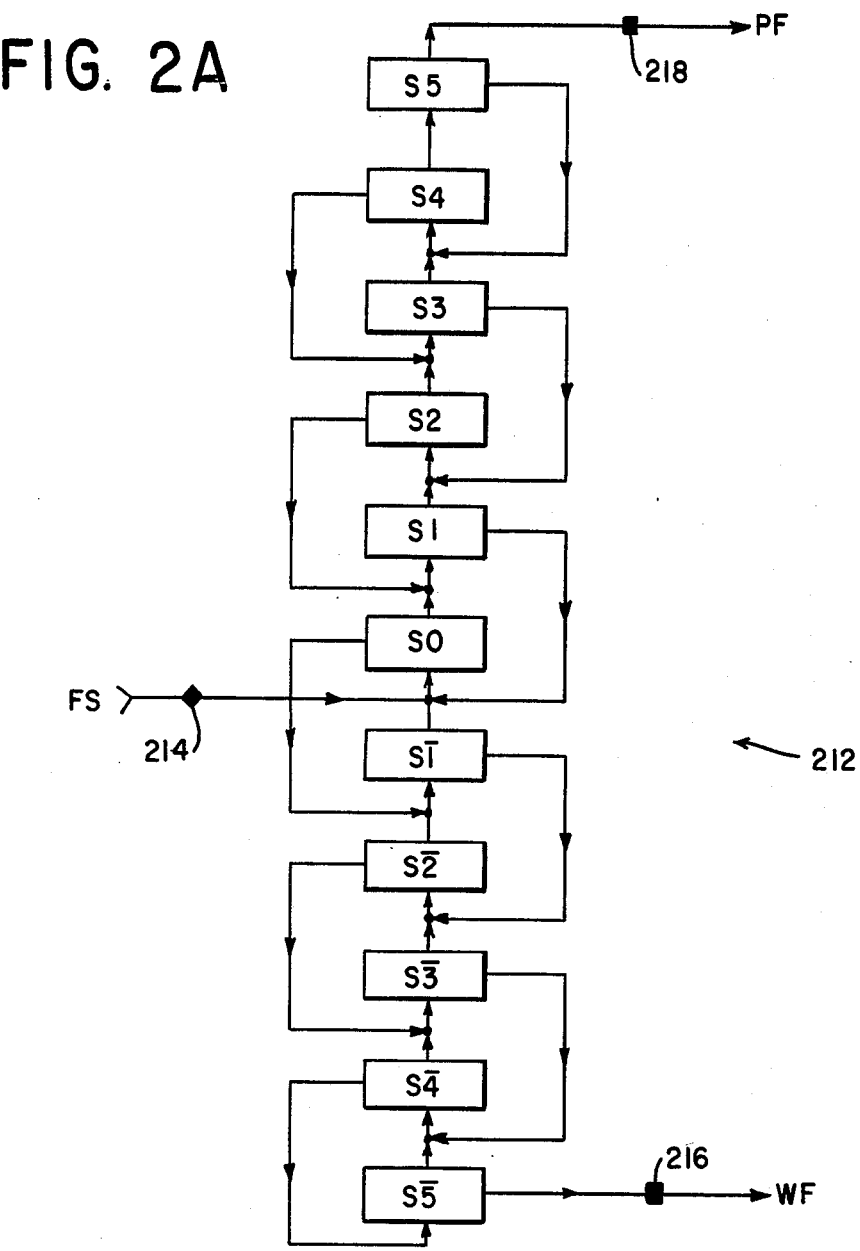
FIG. 2A is a schematic flow diagram of a representative one-up/one-down cascade included in the isotope-enrichment unit of FIG. 2.

Referring now to FIG. 2, a first isotope-enrichment unit 200 is shown in a schematic flow graph. The first isotope-enrichment unit 200 includes a first subunit 210, a second subunit 220, and a third subunit 230. The first subunit 210 includes cascades 212A–212J. Similarly, the second subunit 220 includes cascades 222A–222M and the third subunit 230 includes cascades 232A–232N. Each of the cascades included in the three subunits 210, 220, and 230 has a plurality of enriching stages and a plurality of stripping stages. The number of cascades in each subunit is not specified since it is not required to understand the present invention and since it will vary from application to application depending, as will be recognized by those skilled in the art, on the rate at which it is desired to produce the light fraction of the subunit and on the capacity of the cascades included in the subunit.

The cascades 212A–212J of the first subunit 210 have inputs 214A–214J, heavy-fraction outputs 216A–216J, and light-fraction outputs 218A–218J. A representative cascade 212 is illustrated in FIG. 2A. The cascade 212 is a conventional one-up/one-down countercurrent cascade having a total of eleven stages. Since the input 214 of the cascade 212 is connected to an input of a stage S0, the stage S0 and the stages higher in the cascade, namely stages S1–S5 inclusive, are the enriching stages of the cascade. The remaining stages of the cascade, namely stages $\overline{S1}$–$\overline{S5}$ inclusive, are the stripping stages. The light fraction produced by the cascade 212 can be withdrawn from a light-fraction output of a top stage $\overline{S5}$ through the light-fraction output 218 of the cascade 212. The heavy fraction can be withdrawn from a heavy-fraction output of a bottom stage S5 through the heavy-fraction output 216. Referring again to FIG. 2, the light-fraction outputs 218A–218J are connected to a first product-fraction discharge line 244 through which the light fraction of uranium hexafluoride produced by the first subunit 210 can be withdrawn. The inputs 214A–214J are connected to a feedstock supply line 240, as are inputs 224A–224M of the cascades 222A–222M of the second subunit 220 and the inputs 234A–234N of the cascades 232A–232N of the third subunit 230. The feedstock supply line 240 is a conduit through which uranium hexafluoride can be directed to the inputs of the cascades of the three subunits. For simplicity, conventional pressure and flow regulators for metering the uranium-hexafluoride feedstock from the feedstock supply line 240 to the cascades 212, 222, and 232 are not shown in FIG. 2, nor are similar conventional control devices shown for discharge lines and other supply lines in this or the other figures. The heavy fraction outputs 216A–216J, 226A–226M, and 236A–236N of the first, second, and third subunits, respectively, are connected to a waste-fraction discharge line 242. The light-fraction outputs 228A–228M of the second subunit 220 are connected to a second product fraction discharge line 246, and light-fraction outputs 238A–238N are connected to a third product-fraction discharge line 248.

From the vertical axis of the flow graph of FIG. 2 it may be seen that the cascades of the first subunit ideally produce a light fraction enriched in $^{235}UF_6$ by a factor of $\alpha^3$ relative to the uranium hexafluoride feedstock. The cascades 222A–222M of the second subunit produce a light fraction enriched ideally by the factor of $\alpha^{3.5}$, and the cascades 232A–232N of the third subunit 230 produce a light fraction enriched ideally by the factor of $\alpha^4$. For a separation factor $\alpha$ equal to 1.5, and a feedstock of natural abundance $UF_6$, the enrichment factors $\alpha^3$, $\alpha^{3.5}$, and $\alpha^4$ respectively correspond to product fractions having $^{235}UF_6$ concentrations of approximately 2.40, 2.93, and 3.59 mole percent. The cascades of all three subunits produce a heavy fraction depleted in $^{235}UF_6$ ideally by a factor of $\alpha^{-3}$, which for $\alpha$ equal to 1.5 corresponds to a waste fraction having a concentration of $^{235}UF_6$ of about 0.21 mole percent.

Figure 2B:
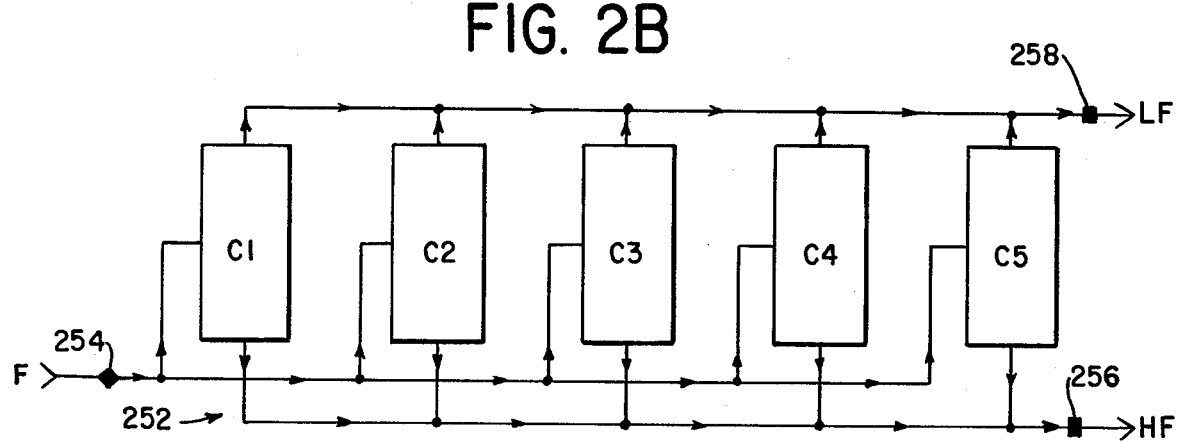
FIG. 2B is a schematic flow diagram of the single-stage auxiliary cascade of the embodiment of FIG. 2.

A first auxiliary cascade 252 has an input 254, a heavy-fraction output 256, and a light-fraction output 258. As shown in FIG. 2B, the first auxiliary cascade 252 is a single-stage cascade made up of five conventional gas centrifuges C1–C5 connected in parallel, the inputs of the gas centrifuges being connected to the input 254 of the auxiliary cascade 252 and the light and heavy-fraction outputs of the gas centrifuges being connected respectively to the light and heavy-fraction outputs 258 and 256 of the auxiliary cascade. Referring again to FIG. 2, a first auxiliary-cascade supply conduit 260 connects the input 254 to the second product-fraction discharge line 246 which in turn is connected to the light-fraction outputs 228A–228M of the cascades of the second subunit 220. The second subunit 220 has a capacity sufficient to produce at least enough light fraction to supply the first auxiliary cascade 252. The heavy-fraction output 256 of the first auxiliary cascade 252 is connected to the first product-fraction discharge line 244 by a first auxiliary-cascade heavy-fraction discharge conduit 262 and the light-fraction output 258 is connected to the third product-fraction discharge line 248 by a first auxiliary-cascade light-fraction discharge conduit 264.

The first auxiliary cascade 252 is a single-stage cascade having a separation factor of about $\alpha$ which can separate uranium hexafluoride into a light fraction enriched in $^{235}UF_6$ ideally by a factor of $\alpha^{0.5}$ and a heavy fraction depleted in $^{235}UF_6$ ideally by a factor of $\alpha^{-0.5}$. Thus when supplied with uranium hexafluoride from the second product-fraction discharge line 246, which carries uranium hexafluoride enriched ideally by a factor of $\alpha^{3.5}$ relative to natural-abundance uranium, the first auxiliary cascade 252 produces a light fraction enriched by a factor of about $\alpha^4$ and a heavy fraction enriched by a factor of about $\alpha^3$ relative to natural-abundance uranium. Thus the light fraction produced by the first auxiliary cascade 252 can be combined with the light fraction produced by the cascades of the third subunit 230, and the heavy fraction produced by the first auxiliary cascade 252 can be combined with the light fraction produced by the cascades of the first subunit 210 without suffering significant mixing losses.

The prior-art isotope-enrichment unit 100 of FIG. 1 can be reconstructed into an isotope-enrichment unit of the embodiment illustrated in FIG. 2. For example, the cascade 112K of the prior-art unit 100 of FIG. 1 could be repiped to make a single-stage cascade having the same number of gas centrifuges and connected to the product-fraction discharge lines 144, 146, 148 in the way the first auxiliary cascade 252 in FIG. 2 is connected to the product-fraction discharge lines 244, 246, 248. The rates at which the three product fractions of such a reconstructed isotope-enrichment unit are produced differ significantly from those of the conventional isotope-enrichment unit from which it was reconstructed: the rate of flow of product fraction produced by the second subunit is reduced while the rates of flow of the product fractions from the first and third subunits are increased. Thus it is possible to alter the distribution of the product fractions of a conventional isotope-enrichment unit such as is shown in FIG. 1 by repiping it to make an isotope-enrichment unit of the present invention.

Referring now to FIG. 3, a second isotope-enrichment unit 300 includes a first subunit 310, a second subunit 320, and a third subunit 330. The first subunit includes cascades 312A–312J having inputs 314A–314J, heavy-fraction outputs 316A–316J, and light-fraction outputs 318A–318J; the second subunit includes cascades 322A–322M having inputs 324A–324M, heavy-fraction outputs 326A–326M, and light-fraction outputs 328A–328M; and the third subunit 330 includes cascades 332A–332N having inputs 334A–334N, heavy-fraction outputs 336A–336N, and light-fraction outputs 338A–338N. The inputs 314, 324, and 334 are connected to a feedstock supply line 340, and the heavy-fraction outputs 316, 326, and 336 are connected to a waste-fraction discharge line 342. The light-fraction outputs 318 of the first subunit 310 are connected to a first product-fraction discharge line 344; the light-fraction ouputs 328 of the second subunit 320 are connected to a second product-fraction discharge line 346; and the light-fraction outputs 338 of the third subunit 330 are connected to a third product-fraction discharge line 348. The three subunits 310, 320, and 330 produce product and waste fractions of the same composition as the fractions produced by the corresponding subunits of the embodiment shown in FIG. 2.

A second auxiliary cascade 352 has an input 354, a heavy-fraction output 356, and a light-fraction output 358. The input 354 of the second auxiliary cascade 352 is connected to the third product-fraction discharge line 348 by a second auxiliary-cascade supply conduit 360. A second auxiliary-cascade heavy-fraction discharge conduit 362 connects the heavy-fraction output 356 of the second auxliary cascade 352 to the first product-fraction discharge line 344. The light fraction produced by the second auxiliary cascade 352 can be withdrawn over a second auxiliary-cascade light-fraction discharge line 364.

As may be seen by referring to the vertical axis of the flow graph of FIG. 3, the second auxiliary cascade 352 can separate uranium hexafluoride into a light fraction enriched in $^{235}UF_6$ ideally by a factor of $\alpha$ and a heavy fraction depleted in $^{235}UF_6$ ideally by a factor of $\alpha^{-1}$. The second auxiliary cascade can be, for example, a one-up/one-down countercurrent cascade having two enriching stages and one stripping stage. When the second auxiliary cascade 352 is supplied with uranium hexafluoride from the light-fraction outputs 338 of the third subunit 330 which is enriched by a factor of about $\alpha^4$ relative to natural-abundance uranium, it produces a light fraction enriched by a factor of about $\alpha^5$ and a heavy fraction enriched by a factor of about $\alpha^3$ relative to natural-abundance uranium. The heavy fraction thus produced by the second auxiliary cascade 352 can be combined without significant mixing loss with the light fraction produced by the cascades of the first subunit 310. The uranium-hexafluoride light fraction thus produced by the second auxiliary cascade 352 has a concentration of $^{235}UF_6$ of about 5.39 mole percent, which is enriched to a greater degree than any of the light fractions produced by the three subunits 310, 320, or 330.

A third preferred embodiment of the present invention is illustrated in FIG. 4. A third isotope-enrichment unit 400 includes a first subunit 410, a second subunit 420, and a third subunit 430. The first subunit includes cascades 412A–412J which include inputs 414A–414J, heavy-fraction outputs 416A–416J, and light-fraction outputs 418A–418J; the second subunit includes cascades 422A–422M which include inputs 424A–424M, heavy-fraction outputs 426A–426M, and light-fraction outputs 428A–428M; and the third subunit 430 includes cascades 432A–432N which include inputs 434A–434N, heavy-fraction outputs 436A–436N, and light-fraction outputs 438A–438N. The inputs 414, 424, and 434 are connected to a feedstock supply line 440 and the heavy-fraction outputs 416, 426, and 436 are connected to a waste-fraction discharge line 442. The light-fraction outputs 418 of the first subunit 410 are connected to a first product-fraction discharge line 444; the light-fraction outputs 428 of the second subunit 420 are connected to a second product-fraction discharge line 446; and the light-fraction outputs 438 of the third subunit 430 are connected to a third product-fraction discharge line 448. The three subunits 410, 420, and 430 produce product and waste fractions of the same composition as the fractions produced by the corresponding subunits of the embodiments shown in FIGS. 2 and 3.

A third auxiliary cascade 452 has an input 454, a heavy-fraction output 456, and a light-fraction output 458. The input 454 of the third auxiliary cascade 452 is connected to the first product-fraction discharge line 444 by a third auxiliary-cascade supply conduit 460. A third auxiliary-cascade light-fraction discharge conduit 464 connects the light-fraction output 458 of the third auxiliary cascade 452 to the third product-fraction discharge line 448. The heavy-fraction output 456 of the third auxiliary cascade 452 is connected by a third auxiliary-cascade heavy-fraction discharge conduit 462 to the feedstock supply line 440 for recycling the uranium-hexafluoride heavy fraction produced by the third auxiliary cascade 452 back to the inputs of the other cascades of the third isotope-enrichment unit 400.

As can be seen in FIG. 3, the heavy-fraction output 456 of the third auxiliary cascade 452 and the light-fraction outputs 418 of the cascades 412 of the first subunit 410 are reciprocal outputs. The third auxiliary-cascade 452 can separate uranium hexafluoride into a light fraction enriched in $^{235}UF_6$ ideally by a factor of $\alpha$ and a heavy fraction depleted in $^{235}UF_6$ ideally by a factor of $\alpha^{-3}$. A one-up/one-down countercurrent cascade having two enriching stages and five stripping stages is a preferred choice for the third auxiliary cascade 452. The cascades of the first subunit 410, if of the same one-up/one-down countercurrent design, each have six enriching stages. Thus the number of stripping stages of the third auxiliary cascade 452 equals the number of enriching stages minus one of the cascades 412 of the first subunit 410 which supplies the third auxiliary cascade 452 with enriched uranium-hexafluoride feed.

When supplied with the uranium hexafluoride enriched by a factor of about $\alpha^3$ over the natural-abundance uranium-hexafluoride feedstock from the first subunit 410, the third auxiliary cascade 452 separates it into a light fraction enriched by a factor of $\alpha^4$ and a heavy fraction which has substantially the same composition as the feedstock. Since the $^{235}UF_6$ concentration in the heavy fraction produced by the third auxiliary cascade 452 is substantially the same as natural-abudance uranium hexafluoride, it can be mixed with the feedstock without significant mixing loss.

Reconstructing the prior-art isotope-enrichment unit 100 of FIG. 1 to make an isotope-enrichment unit of the embodiment of FIG. 4 can substantially change the rates at which the three product fractions are produced. In particular, the average concentration of $^{235}UF_6$ in the product fractions can be increased to a relatively large extent. If it is desired to increase the average enrichment of product fractions to the maximum extent by reconstructing the prior-art isotope-enrichment unit 100 to make an isotope enrichment unit of this embodiment, it is generally preferable for the auxiliary cascade to have few enriching stages. Two competing factors are involved in increasing the average enrichment: (1) the greater the number of enriching stages of an auxiliary cascade, the more enriched is the light fraction it produces, but (2) the greater the number of enriching stages, the lower the rate at which cascades of most designs produce light fraction. The second factor ordinarily dominates for most conventional cascade designs if the number of centrifuges is kept fixed, in the sense that the product of the rate at which the light fraction is produced and the concentration of $^{235}UF_6$ in the light fraction is greater the fewer the number of enriching stages, because fewer enriching stages leads to more centrifuges in the stripping section and consequently to a greater increase in the average enrichment.

FIGS. 5A and 5B depict a fourth embodiment of the present invention in alternate modes of operation. Referring now to FIGS. 5A and 5B, a fourth isotope-enrichment unit 500 includes a first subunit 510, a second subunit 520, and a third subunit 530. The first subunit includes cascades 512A–512J having inputs 514A–514J, heavy-fraction outputs 516A–516J, and light-fraction outputs 518A–518J; the second subunit includes cascades 522A–522M having inputs 524A–524M, heavy-fraction outputs 526A–526M, and light-fraction outputs 528A–528M; and the third subunit 530 includes cascades 532A–532N having inputs 534A–534N, heavy-fraction outputs 536A–536N, and light-fraction outputs 538A–538N. The inputs 514, 524, and 534 are connected to a feedstock supply line 540, and the heavy-fraction outputs 516, 526, and 536 are connected to a waste-fraction discharge line 542. The light-fraction outputs 518 of the first subunit 510 are connected to a first product-fraction discharge line 544; the light-fraction outputs 528 of the second subunit 520 are connected to a second product-fraction discharge line 546; and the lightfraction outputs 538 of the third subunit 530 are connected to a third product-fraction discharge line 548. The three subunits 510, 520, and 530 produce product and waste fractions of the same composition as the fractions produced by the corresponding subunits of the previous embodiments.

A first swinging auxiliary cascade 552 has an input 554, a heavy-fraction output 556, and a light-fraction output 558. Connected to the input 554 is a trunk port of a two-way feed supply valve 570. A first branch port of the supply valve 570 is connected to an end of a lean feed supply conduit 560, and a second branch port of the supply valve 570 to an end of a rich feed supply conduit 561. The other end of the lean feed supply conduit 560 is connected to the feedstock supply line 540 and the other end of the rich feed supply conduit 561 is connected to the first product-fraction discharge line 544. Similarly, the light-fraction output 558 is connected to a two-way light-fraction discharge valve 572, which is connected to a lean light-fraction discharge conduit 564 and to a rich light-fraction conduit 565. The lean light-fraction discharge conduit 564 is also connected to the first product-fraction discharge line 544. Rich light fraction can be withdrawn from the isotope-enrichment unit 500 over the rich light-fraction discharge line 565. The heavy-fraction output 556 of the first swinging auxiliary cascade 552 is connected to a two-way heavy-fraction discharge valve 574 which is connected to a lean heavy-fraction discharge conduit 562 and to a rich heavy-fraction discharge conduit 563. The lean heavy-fraction discharge conduit 562 is also connected to the waste-fraction discharge line 542. The rich heavy-fraction disharge conduit 563 is connected to the feedstock supply line 540.

The two-way supply and discharge valves 570, 572, and 574 are shown schematically as filled-in triangles in FIGS. 5A and 5B. A preferred three-port, two-way valve 576 for this application is shown in greater detail in FIG. 6A. A trunk conduit 578 for connecting the valve to an input or output of the swinging auxiliary cascade 552 is connected to a valve mechanism 580 through a trunk port 581. The valve mechanism 580 is also connected to a principal branch conduit 582 and to an alternate branch conduit 584 through a principal branch port 583 and an alternate branch port 585 respectively. The trunk port 581 is in closer communication to the input or output of the auxiliary cascade 552 than either of the two branch ports 583 and 585. As shown in FIG. 6A, the trunk conduit 578 is in communication with the alternate branch conduit 584 through a channel 586. If the valve mechanism 580 is rotated counterclock-wise by ninety degrees the trunk conduit 578 communicates with the principal branch conduit 582. Only one of the two branch conduits 582 and 584 is in communication with the trunk conduit 578 at any given time.

A second example of a two-way valve is a "T"-joint conduit with an on-off valve in each arm of the "T", shown in FIG. 6B. The trunk conduit 578 can be alternately connected to the principal branch conduit 582 or the alternate branch conduit 584 by appropriately opening and closing a first on-off valve 590 and a second on-off valve 592, which are connected in series respectively with the principal and alternate branch conduits 582 and 584.

Referring again to FIG. 5A, it can be seen that the first swinging auxiliary cascade 552 produces light and heavy fractions respectively enriched in $^{235}UF_6$ ideally by the same factors as the cascades 512 for the first subunit 510. Thus when the two-way supply and discharge valves 570, 572, and 574 respectively connect the input 554 to the lean feed supply conduit 560, the light-fraction output 558 to the lean light-fraction discharge conduit 564, and the heavy-fraction output 556 to the lean heavy-fraction discharge conduit 562, the swinging auxiliary cascade 552 operates in parallel with the cascades 512 of the first subunit 510. This "lean mode" of operating the fourth isotope-enrichment unit 500 is shown in FIG. 5A. In this mode the light and heavy fractions produced by the swinging auxiliary cascade 552 can be combined with the light and heavy fractions produced by the first subunit 510 without significant mixing losses.

On the other hand, if the two-way supply and discharge valves 570, 572, and 574 are switched so that the input 554 of the swinging auxiliary cascade 552 is connected to the rich feed supply conduit 561, the light-fraction output 558 is connected to the rich light-fraction discharge conduit 565, and the heavy-fraction output 556 is connected to the rich heavy-fraction discharge conduit 563, the fourth isotope-enrichment unit 500 operates in the "rich mode" shown in FIG. 5B. Note that in the flow graph of FIG. 5B the swinging auxiliary cascade 552 is shown in a higher vertical position than in FIG. 5A to indicate that the gaseous mixtures at its input and outputs are richer in the sense of having higher concentrations of $^{235}UF_6$. Thus, for example, when operated in the rich mode the first swinging auxiliary cascade 552 is supplied with uranium hexafluoride enriched in $^{235}UF_6$ by a factor ideally of $\alpha^3$, whereas when operated in the lean mode, it is supplied with natural-abundance uranium hexafluoride.

The heavy-fraction output 556 of the first swinging auxiliary cascade 552 and the light-fraction outputs 518 of the cascades 512 of the first subunit 510 are reciprocal outputs. Thus the heavy fraction produced by the cascade in rich mode of operation of FIG. 5B has ideally the same composition as the natural-abundance feedstock. The light fraction produced by the swinging auxiliary cascade 552 in this mode is enriched in $^{235}UF_6$ by a factor of substantially $\alpha^6$. Depending on its mode of operation, the fourth isotope-enrichment unit 500 produces either three or four product fractions. The average concentration of $^{235}UF_6$ in the four product fractions of the rich mode is significantly greater than the average concentration in the three product fractions of the lean mode. The mixing losses for the two modes of operation are substantially the same and can be made very low.

Figure 7:
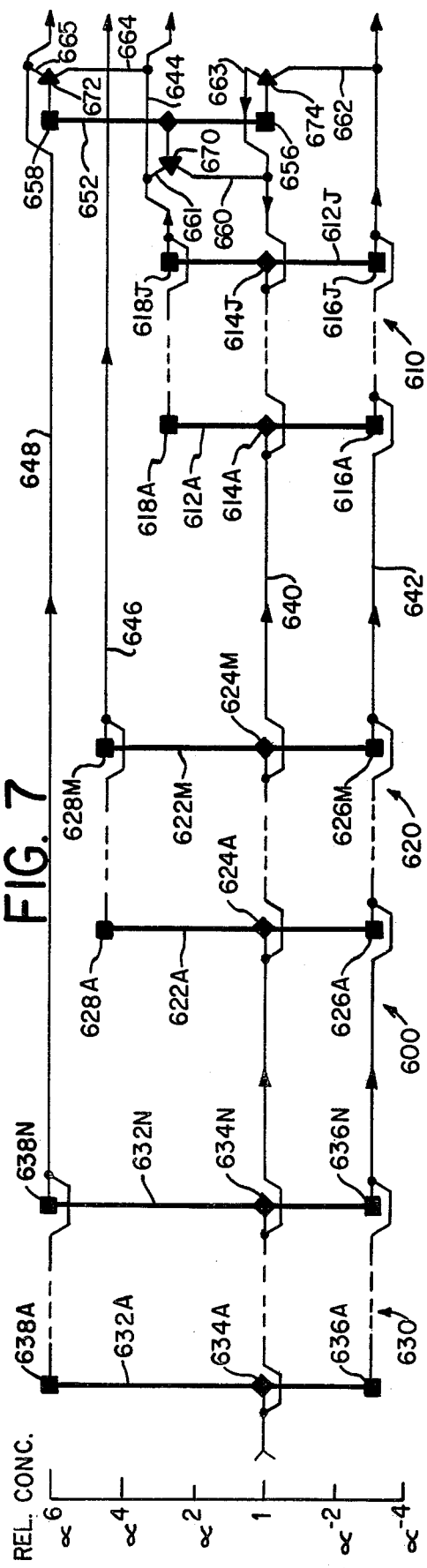
FIG. 7 is a flow graph of a fifth embodiment of the present invention. As with the embodiment of FIGS. 5A and 5B, this embodiment has two modes of operation. For conciseness only one mode of operation is shown in FIG. 7.

An isotope-enrichment unit of the present invention which includes a swinging auxiliary cascade and produces the same number of product fractions in both the rich and lean modes of operation is depicted in FIG. 7. Referring now to FIG. 7, a fifth isotope-enrichment unit 600 includes first, second, and third subunits 610, 620, and 630. The first subunit 610 can enrich uranium hexafluoride ideally by a factor of $\alpha^3$, the second subunit 620 by a factor of $\alpha^{4.5}$, and the third subunit 630 by a factor of $\alpha^6$. The cascades of these three subunits and their inputs and outputs are designated in FIG. 7 in a manner exactly analagous to the three subunits of the previous embodiments. For conciseness the designations will not be enumerated in the text.

A second swinging auxiliary cascade 652 has an input 654, a heavy-fraction output 656, and a light-fraction output 658. Connected to the input 654 is a trunk port of a two-way supply valve 670 for connecting the input 654 through one of two branch ports either to a lean feed supply conduit 660 or to rich feed supply conduit 661. The lean feed supply conduit 660 is also connected to a feedstock supply line 640 and the rich feed supply conduit 661 is connected to a first product-fraction discharge line 644, which in turn is connected to the light-fraction outputs of the cascades of the first subunit 610. The light-fraction output 658 of the second swinging auxiliary cascade 652 is connected to a two-way light-fraction discharge valve 672 for connecting it either to a lean light-fraction discharge conduit 664 or to a rich light-fraction discharge conduit 665. The lean light-fraction discharge conduit 664 is also connected to the first product-fraction discharge line 664. The rich light-fraction discharge conduit 665 is connected to a third product-fraction discharge conduit 648 which in turn is connected to the light-fraction outputs of the cascades of the third subunit 630. The heavy-fraction output 656 of the second swinging auxiliary cascade 652 is connected to a two-way heavy-fraction discharge valve 674 for connecting the heavy-fraction output 656 either to a lean heavy-fraction discharge conduit 662 or to a rich heavy fraction discharge conduit 663. The lean heavy-fraction discharge conduit 662 is also connected to a waste-fraction discharge line 642 to which the heavy-fraction outputs of the cascades of the three subunits 610, 620, and 630 are also connected. The rich heavy-fraction discharge conduit 663 is connected to the feed-stock supply line 640. The two-way supply and discharge valves 670, 672, and 674 can be valves of the type shown in FIGS. 6A and 6B.

The second swinging auxiliary cascade 652 produces a light fraction enriched in $^{235}UF_6$ by a factor of substantially $\alpha^3$ and a heavy fraction depleted by a factor of substantially $\alpha^{-3}$. The enrichment and depletion factors of the swinging auxiliary cascade 652 are ideally the same as those of the cascades of the first subunit 610. Thus in the lean mode of operation, not illustrated in FIG. 7, the second swinging auxiliary cascade 652 is operated in parallel to the cascades of the first subunit 610 in a manner analagous to the lean mode of operation of the first swinging auxiliary cascade 552 illustrated in FIG. 5A. In the rich mode of operation which is illustrated in FIG. 7, the two-way supply and discharge valves are set to supply the input 654 of the second swinging-auxiliary cascade 652 with enriched uranium hexafluoride from the light fraction produced by the first subunit 610 and to combine the light and heavy fractions produced by the swinging auxiliary cascade 652 respectively with the light fraction produced by the third subunit 630 and carried in the third product-fraction discharge line 648 and the uranium hexafluoride feedstock carried in the feedstock supply line 640. The heavy-fraction output 656 of the second swinging auxiliary cascade 652 and the light-fraction outputs 618 of the cascades 612 of the first subunit 610 are reciprocal outputs. Thus combining the heavy fraction produced by the second swinging auxiliary cascade 652 with the uranium hexafluoride feedstock leads to no significant mixing losses. Similarly, combining the light fraction produced by the second swinging auxiliary cascade 652 with the light fraction produced by the third subunit 630 leads to substantially no mixing losses because the auxiliary cascade enriches uranium hexafluoride previously enriched by a factor of ideally $\alpha^3$ by an additional factor of ideally $\alpha^3$ leading to an overall enrichment factor of substantially $\alpha^6$, which is substantially the same enrichment factor as provided by the cascades of the third subunit 630.

Figure 8:
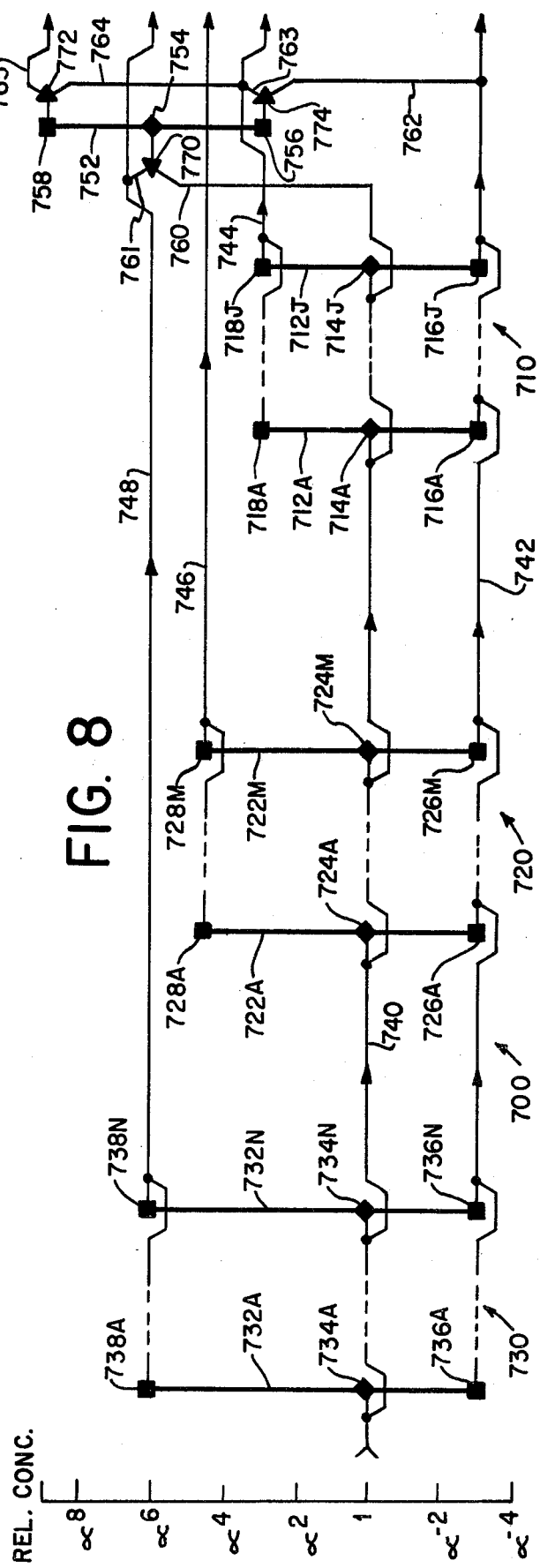
FIG. 8 is a flow graph of a sixth embodiment of the present invention. This embodiment also has two modes of operation, only one of which is shown.

A sixth isotope-enrichment unit 700 is shown in FIG. 8 and includes first, second, and third subunits 710, 720, and 730 which can respectively enrich uranium hexafluoride by the same factors as the corresponding subunits of the fifth isotope-enrichment unit 600 described above. As in the case of FIG. 7 the reference numerals for the cascades of the three subunits and their inputs and outputs will not be enumerated in the text for conciseness.

A third swinging auxiliary cascade 752 has an input 754, a heavy-fraction output 756, and a light-fraction output 758. The input 754 can be connected alternatively to a feedstock supply line 740 or to a third product-fraction discharge line 748 by a two-way supply valve 770 and lean and rich feed supply conduits 760 and 761. A two-way ligh-fraction discharge valve 772 connects the light-fraction output either to a first product-fraction discharge line 744 by way of a lean light-fraction discharge conduit 764 or to a rich light-fraction discharge conduit 765 through which the light fraction produced by the third swinging auxiliary cascade 752 can be withdrawn in the rich mode of operation. The heavy-fraction output 756 can be connected alternatively by a two-way heavy-fraction discharge valve 774 and lean and rich heavy-fraction discharge conduits 762 and 763 to a waste-fraction discharge line 742 and the first product-fraction discharge line 744. In the rich mode of operation illustrated in FIG. 8, the sixth iosotope-enrichment unit 700 can produce four product fractions, one of the product fractions being the light fraction produced by the third swinging auxiliary cascade 752. In the lean mode of operation, not shown, the third swinging auxiliary cascade 752 operates in parallel to the cascades of the first subunit 710. In this mode of operation only three product fractions are produced. Since the heavy fraction produced by the third swinging-auxiliary cascade 752 is not combined with the gaseous-mixture feedstock and recycled back to the cascades of the three subunits 710, 720, and 730 in the rich mode of operation, the increase in the average concentration of $^{235}UF_6$ in the product fractions upon switching from the lean to the rich mode is relatively small compared to the corresponding change for the fourth and fifth isotope-enrichment units 600 and 700 described above. Although the change in the average concentration of $^{235}UF_6$ may be relatively small, the change in the product distribution is nonetheless substantial and may be useful for some applications.

A seventh isotope-enrichment unit 800 is shown in FIG. 9 and includes first, second, and third subunits 810, 820, and 830 which can respectively enrich uranium hexafluoride by the same factors as the corresponding subunits of the fourth isotope-enrichment unit 500 described above. As in the case of FIG. 7 the reference numerals for the cascades of the three subunits and their inputs and outputs will not be enumerated in the text for conciseness.

A fourth swinging auxiliary cascade 852 is a single-stage cascade and has an input 854, a heavy-fraction output 856, and a light-fraction output 858. The input 854 can be connected alternatively to a second or a third product-fraction discharge line 846 or 848 by a two-way supply valve 870 and lean and rich feed supply conduits 860 and 861. A two-way light-fraction discharge valve 872 connects the light-fraction output 858 either to a third product-fraction discharge line 848 by way of a lean light-fraction discharge conduit 864 or to a rich light-fraction discharge conduit 865 through which the light fraction produced by the third swinging auxiliary cascade 852 can be withdrawn in the rich mode of operation. The heavy-fraction output 856 can be connected alternatively by a two-way heavy-fraction discharge valve 874 and lean and rich heavy-fraction discharge conduits 862 and 863 to the first or the second product-fraction discharge lines 844 or 846. In the lean mode of operation illustrated in FIG. 9, the seventh isotope-enrichment unit 800 can produce three product fractions. In the rich mode of operation, not shown, four product fractions are produced.

It will be recognized that a fourth subunit of cascades which produce a product fraction enriched ideally by a factor of $\alpha^{4.5}$ and a waste fraction depleted by a factor of $\alpha^{-3}$ can be included in the seventh isotope enrichment unit 800, and the rich light-fraction discharge line 865 connected to the light-fraction discharge line connected to the light-fraction outputs of the cascades of the fourth subunit. In this case four product fractions are produced independent of the mode of operation of the swinging auxiliary cascade 852. The rates at which the four product fractions are produced can be varied easily and without incurring significant mixing losses by swinging the single-stage auxiliary cascade 852 between the rich and lean modes of operation.

In operation, the preferred embodiments described above substantially continuously separate a supply of natural-abundance uranium hexafluoride into at least four streams of unit-output fractions including a waste fraction depleted in 235-uranium to about 0.2 mole percent and three or more product fractions enriched in 235-uranium to roughly 3 mole percent suitable for nuclear reactor fuel. A stream of natural-abundance uranium hexafluoride is introduced into each input of a first group of cascades of gas centrifuges over a feedstock supply line to introduce the uranium hexafluoride into the cascades. The streams are centrifugally processed with enriching and stripping stages of the cascades into light-fraction streams and heavy-fraction streams. A first stream of a light gaseous-mixture fraction produced by the first group of cascades is directed into an input of an auxiliary cascade of gas centrifuges to introduce the fraction into the auxiliary cascade. This first light-fraction stream is centrifugally processed with the auxiliary cascade to separate it into an auxiliary light-fraction stream and an auxiliary heavy-fraction stream. The mole fraction of the uranium-235 in the auxiliary light fraction is approximately equal to the mole fraction of uranium-235 in a product fraction, and the mole fraction of uranium-235 in the auxiliary heavy fraction is approximately equal to the mole fraction of the uranium isotope in one of the product fractions, the waste fraction, or natural-abundance uranium. A stream of a product fraction is withdrawn at least in part from the auxiliary light-fraction stream; the stream of the waste fraction is withdrawn from the heavy-fraction streams produced by the first group of cascades; and streams of product fractions are withdrawn at least in part from light-fraction streams produced by the first group of cascades. The great flexibility in changing the product distributions for these embodiments is achieved without incurring significant mixing losses, since streams from which the product and waste fraction streams are withdrawn are respectively enriched and depleted in uranium-235 to approximately the mole fractions of the corresponding product and waste fractions. It will be recognized that other embodiments of the concept of the present invention may be preferred for other applications, particularly for applications involving nuclear isotopes other than uranium-235 and uranium-238. For uranium or other isotopes, it may be advantageous in certain applications to provide flexibility with respect to the enrichment of the waste fractions by supplying an auxiliary cascade with a heavy gaseous mixture fraction instead of a light gaseous mixture fraction.

FIG. 10 illustrates an eighth isotope-enrichment unit 900 suitable for both substantially continuous operation and batch operation which includes first, second, and third subunits 910, 920, and 930 which can respectively enrich uranium hexafluoride by the same factors as the corresponding subunits of the fourth isotope-enrichment unit 500 described above. For conciseness the reference numerals of the three subunits will not be enumerated.

A fifth swinging auxiliary cascade 952 has an input 954, a heavy-fraction output 956, and a light-fraction output 958. The heavy-fraction output 956 of the swinging auxiliary cascade 952 and light-fraction output 918 of cascades 912 of the first subunit 910 are reciprocal outputs. To maximize the increase in the average concentration of the light isotope in the product fractions, the auxiliary cascade 952 includes only one enriching stage.

A first product-fraction discharge line 944 is connected to a condenser 980 for condensing the gaseous product fraction into a pressure tank 984 in a solid or liquid state. The pressure tank 984 is detachably connected to the condenser 980 through a conduit 982. Compressor-refrigerators for condensing gaseous uranium hexafluoride into pressure tanks in a solid state are in standard use in gaseous diffusion plants and are preferred condensers 980 for this embodiment. The input 954 of the fifth swinging auxiliary cascade 952 is connected through a conduit 960 to a gasifier 981 to which the pressure tank 984 can be detachably connected through a conduit 983. The gasifier 981 respectively sublimes or evaporates the solid or liquid product fraction contained in the pressure tank 984. In the case of uranium hexafluoride, the gasifier 981 is preferably a heater such as is in standard use in gaseous diffusion plants for subliming solid uranium hexafluoride from storage tanks. By first condensing product fraction from the first subunit into the pressure tank 984 with the condenser 980, transporting the tank 984 to the gasifier 981, and gasifying the contents of the tank 984 with the gasifier 981 and discharging the gasified contents into the input 954 of the fifth swinging auxiliary cascade 952, product fraction from the first subunit 910 can be conveyed from the first subunit 910 to the input 954 of the auxiliary cascade 952 and directed into the input 954. This mode of conveying gaseous-mixture fraction from a first group of cascades to an auxiliary cascade can be employed in other embodiments of the present invention.

EXAMPLE

The numerical example set forth in Table I below compares the use of the present invention to shift the product distribution of a gas-centrifuge isotope-enrichment plant for uranium reactor fuel to the conventional method of shifting the product distribution by repiping cascades. The gas centrifuges of the example have separation factors $\alpha$ of 1.5 and are interconnected to form one-up/one-down cascades. Distributions of product rates and of centrifuges among different types of cascades for three plants, each having a total capacity of 1,000,000 kg SWU/y, are listed in Table I.

Referring to Table I, Case 1 is a typical uranium-enrichment plant for producing three product fractions with three types of cascades: those designated A having 7 enriching stages, those designated B having 5, and those designated C having 3. All cascades have 4 stripping stages and are supplied with natural-abundance uranium hexafluoride.

In Case 2, the product distribution is shifted by coverting 13.3 percent of the C cascades of Case 1 into auxiliary cascades, designated D. Four percent of the centrifuges of the plant are incorporated in the D auxiliary cascades. The D auxiliary cascades have the same number of stripping and enriching stages as the C cascades, but are supplied with light fraction produced by the B cascades instead of natural-abundance uranium hexafluoride. The heavy-fraction outputs of the D auxiliary cascades and the light-fraction outputs of the B cascades are reciprocal outputs and thus the mole percent of $^{235}UF_6$ in the heavy fraction produced by the D auxiliary cascades approximately equals 0.711, the value for natural-abundance uranium. For Case 2, the heavy fraction produced by the D auxiliary cascades is combined with the natural-abundance uranium hexafluoride feedstock and recycled to the inputs of the A, B, and C cascades.

Case 3 has the same product distribution as Case 2, but the shift in product distribution is achieved by repiping a number of the B and C cascades into cascades having 8 enriching stages and 4 stripping stages, designated in Table I as E cascades. Note that to achieve the same product distribution as Case 2, cascades including 26.5 percent of the centrifuges of the plant had to be repiped, a substantial undertaking. This shift in product distribution is conveniently accomplished with the present invention by simply swinging valves to convert C cascades incorporating only 4 percent of the centrifuges of the plant into D auxiliary cascades.

It will be recognized by those familiar with this art that modifications of the foregoing specific embodiments may be made without departing from the scope and spirit of the invention, which is limited solely in accordance with the claims. For example, more than one auxiliary cascade may be supplied with gaseous-mixture feed by a group of cascades. Swinging auxiliary cascades may be swung among three or more alternative modes of operation. Gaseous mixtures of isotopes other than uranium-235 and uranium-238 can be separated by the present invention.

compound of a heavy nuclear isotope at a predetermined concentration into at least two unit-output fractions including a waste fraction depleted in the light isotope to a predetermined concentration and a product fraction enriched in the light isotope to a predetermined concentration, comprising:

(a) a first group of cascades of gas centrifuges, each cascade having an enriching stage, a stripping stage, an input, a light-fraction output, and a heavy-fraction output for separating the gaseous-mixture feedstock into light and heavy gaseous-mixture fractions;

(b) means for introducing the gaseous-mixture feedstock into each input of the first group of cascades;

(c) means for withdrawing at least a portion of a product fraction from light-fraction outputs of the first group of cascades;

(d) means for withdrawing at least a portion of a waste fraction from heavy-fraction outputs of the first group of cascades;

(e) an auxiliary cascade having an input, a light-fraction output, and a heavy-fraction output;

(f) a first conduit connected between an output of a first cascade included in the first group and the input of the auxiliary cascade for directing at least a portion of a gaseous-mixture fraction produced by the first group of cascades into the auxiliary cascade for further separation into a light fraction and a heavy fraction; and (g) means for withdrawing at least a portion of a unit-output fraction from an output of the auxiliary cascade.

2. The isotope-enrichment unit according to claim 1 in which the auxiliary cascade is a single-stage cascade.

3. The isotope-enrichment unit according to claim 1 in which said output of the first cascade is a light-fraction output, the first conduit thereby directing at least a portion of a light fraction produced by the first group of cascades to the auxiliary cascade for further separation into a light fraction and a heavy fraction.

4. The isotope-enrichment unit according to claim 3 in which said output of the first cascade and the heavy-fraction output of the auxiliary cascade are reciprocal outputs.

TABLE I

| Cascade Designation | Number of Stages Enriching Stripping | Mole Percent $^{235}UF_6$ (a) Light Fraction (b) Feed (c) Heavy Fraction | Case 1 Original Product Distribution | | Case 2 Prod. Dist. Shifted With Auxiliary Cascades | | Case 3 Prod. Dist. Shifted by Conventional Repiping | |
|---|---|---|---|---|---|---|---|---|
| | | | Product Rate (kg/y) | Fraction of Centrifuges (percent) | Product Rate (kg/y) | Fraction of Centrifuges (percent) | Product Rate (kg/y) | Fraction of Centrifuges (percent) |
| A | 7/4 | (a) 2.874 (b) 0.711 (c) 0.259 | 71642 | 25.0 | 71642 | 25.0 | 71642 | 25.0 |
| B | 5/4 | (a) 1.935 (b) 0.711 (c) 0.259 | 256057 | 45.0 | 128028 | 45.0 | 128028 | 22.5 |
| C | 3/4 | (a) 1.298 (b) 0.711 (c) 0.259 | 417542 | 30.0 | 361875 | 26.0 | 361875 | 26.0 |
| D | 3/4 | (a) 3.497 (b) 1.935 (c) 0.711 | 0 | 0.0 | 56243 | 4.0 | 0 | 0.0 |
| E | 8/4 | (a) 3.497 (b) 0.711 (c) 0.259 | 0 | 0.0 | 0 | 0.0 | 56243 | 26.5 |

I claim:

1. An isotope-enrichment unit for separating a gaseous-mixture feedstock including a compound of a light nuclear isotope at a predetermined concentration and a 5. The isotope-enrichment unit according to claim 4 in which the auxiliary cascade has a number of stripping stages equal to the number of enriching stages of the first cascade minus one.

6. The isotope-enrichment unit according to claim 3 further comprising a second conduit connected between the light-fraction output of the auxiliary cascade and the means for withdrawing product fraction from the first group of cascades for combining the light fraction produced by the auxiliary cascade with a product fraction from the first group of cascades.

7. The isotope-enrichment unit according to claim 6 in which said output of the first cascade and the heavy-fraction output of the auxiliary cascade are reciprocal outputs and which further comprises a third conduit connected between the heavy-fraction output of the auxiliary cascade and the means for introducing the gaseous-mixture feedstock into the inputs of the first group of cascades for combining the heavy fraction produced by the auxiliary cascade with the geseous-mixture feedstock.

8. The isotope-enrichment unit according to claim 7 in which the auxiliary cascade has a number of stripping stages equal to the number of enriching stages of the first cascade minus one.

9. The isotope-enrichment unit according to claim 7 further comprising first, second, and third flow regulators connected respectively in series with the first, second, and third conduits for controlling the flow of gaseous mixtures in the three conduits.

10. The isotope-enrichment unit according to claim 1 further comprising:
   (h) first valve means for selectively permitting fluid flow between a trunk port and one of a principal branch port and an alternate branch port, the trunk port and the principal branch port being connected in series with the first conduit, with the trunk port being in closer communication with the input of the auxiliary cascade than the branch ports; and
   (i) a first alternate conduit connected between the alternate branch port of the first valve means and an alternate source of a gaseous-mixture fraction.

11. The isotope-enrichment unit according to claim 10 in which said output of the first cascade to which the first conduit is connected is a light-fraction output and the alternate source of a gaseous-mixture fraction includes a light-fraction output of a second cascade included in the first group of cascades, the number of enriching stages of the second cascade differing from the number of enriching stages of the first cascade.

12. The isotope-enrichment unit according to claim 10 in which:
   the auxiliary cascade is a single-stage cascade;
   the means for withdrawing at least a portion of a product fraction from the light-fraction outputs of the first group of cascades comprises a first, a second, a third, and a fourth product-fraction discharge line, each discharge line being connected to a light-fraction output of a cascade included in the first group of cascades, the four cascades to which the discharge lines are connected having different numbers of enriching stages; and
   the means for withdrawing at least a portion of a unit-output fraction from an output of the auxiliary cascade comprises:
   (g.1) the second conduit connected between the heavy-fraction output of the auxiliary cascade and the first product-fraction discharge line;
   (g.2) a second valve means for selectively permitting fluid flow between a trunk port and on of a principal branch port and an alternate branch port, the trunk port and the principal branch port being connected in series with the second conduit, with the trunk port being in closer communication with the output of the auxiliary cascade than the branch ports;
   (g.3) a second alternate conduit connected between the alternate branch port of the second valve means and the second product-fraction discharge line;
   (g.4) a third conduit connected between the light-fraction output of the auxiliary cascade and the third product-fraction discharge line;
   (g.5) a third valve means for selectively permitting fluid flow between a trunk port and one of a principal branch port and an alternate branch port, the trunk port and the principal branch port being connected in series with the third conduit, with the trunk port being in closer communication with the output of the auxiliary cascade than the branch ports; and
   (g.6) a third alternate conduit connected between the alternate branch port of the third valve means and the fourth product-fraction discharge line.

13. The isotope-enrichment unit according to claim 12 in which the first, second, and third valve means each comprises a three-port, two-way valve.

14. The isotope-enrichment unit according to claim 12 in which the first, second, and third valve means each comprises a "T"-joint conduit with an on-off valve in each arm of the "T".

15. The isotope-enrichment unit according to claim 10 in which said output of the first cascade to which the first conduit is connected is a light-fraction output and the alternate source of a gaseous-mixture fraction is the means for introducing the gaseous-mixture feedstock into the first group of cascades.

16. The isotope-enrichment unit according to claim 15 in which:
   said output of the first cascade and the heavy-fraction output of the auxiliary cascade are reciprocal outputs; and
   the means for withdrawing at least a portion of a unit-output fraction from an output of the auxiliary cascade comprises:
   (g.1) a second conduit connected between the heavy-fraction output of the auxiliary cascade and the means for introducing the gaseous-mixture feedstock into the first group of cascades;
   (g.2) a second valve means for selectively permitting fluid flow between a trunk port and one of a principal branch port and an alternate branch port, the trunk port and the principal branch port being connected in series with the second conduit, with the trunk port being in closer communication with the output of the auxiliary cascade than the branch ports; and
   (g.3) a second alternate conduit connected between the alternate branch port of the second valve means and the means for withdrawing the waste fraction from the first group of cascades.

17. The isotope-enrichment unit according to claim 16 in which the auxiliary cascade has a number of stripping stages equal to the number of enriching stages of the first cascade minus one.

18. The isotope-enrichment unit according to claim 16 in which:

the means for withdrawing at least a portion of a product fraction from the light-fraction outputs of the first group of cascades comprises a first and a second product-fraction discharge line, each discharge line being connected to a light-fraction output of a cascade included in the first group of cascades, the two cascades to which the discharge lines are connected having different numbers of enriching stages; and the means for withdrawing at least a portion of a unit-output fraction from an output of the auxiliary cascade further comprises:

(g.4) a third conduit connected between the light-fraction output of the auxiliary cascade and the first product-fraction discharge line;

(g.5) a third valve means for selectively permitting fluid flow between a trunk port and one of a principal branch port and an alternate branch port, the trunk port and the principal branch port being connected in series with the third conduit, with the trunk port being in closer communication with the output of the auxiliary cascade than the branch ports; and (g.6) a third alternate conduit connected between the alternate branch port of the third valve means and the second product-fraction discharge line.

19. An isotope-enrichment unit for separating a gaseous-mixture feedstock including a compound of a light nuclear isotope at a predetermined concentration and a compound of a heavy nuclear isotope at a predetermined concentration into at least two unit-output fractions including a waste fraction depleted in the light isotope to a predetermined concentration and a product fraction enriched in the light isotope to a predetermined concentration, comprising:

(a) a first group of cascades of gas centrifuges, each cascade having an enriching stage, a stripping stage, an input, a light-fraction output, and a heavy-fraction output for separating the gaseous-mixture feedstock into light and heavy gaseous-mixture fractions;

(b) means for introducing the gaseous-mixture feedstock into each input of the first group of cascades;

(c) means for withdrawing at least a portion of a product fraction from light-fraction outputs of the first group of cascades;

(d) means for withdrawing at least a portion of a waste fraction from heavy-fraction outputs of the first group of cascades;

(e) an auxiliary cascade having an input, a light-fraction output, and a heavy-fraction output, the heavy-fraction output being a reciprocal output to a light-fraction output of a first cascade in the first group;

(f) means for conveying a gaseous mixture from said output of the first cascade to the input of the auxiliary cascade and directing it into the input so that at least a portion of a light gaseous-mixture fraction produced by the first group of cascades can be further separated into a light fraction and a heavy fraction by the auxiliary cascade;

(g) means for withdrawing at least a portion of a product fraction from the light fraction output of the auxiliary cascade; and (h) means for withdrawing gaseous-mixture feedstock from the heavy fraction output of the auxiliary cascade.

20. The isotope-enrichment unit according to claim 19 in which the means for conveying and directing the gaseous-mixture fraction includes:

(f.1) a tank detachably connectable to said output of the first cascade for receiving gaseous-mixture fraction from the first cascade and to the input of the auxiliary cascade for discharging gaseous-mixture fraction into the auxiliary cascade.

21. The isotope-enrichment unit according to claim 20 in which the means for conveying the gaseous-mixture fraction further includes:

(f.2) a condenser for condensing the gaseous-mixture fraction into the tank in a condensed state; and (f.3) a gasifier for gasifying contents of the tank into the input of the auxiliary cascade.

22. The isotope-enrichment unit according to claim 19 in which the means for conveying and directing the fraction includes a first conduit connected between said output of the first cascade and the input of the auxiliary cascade.

23. The isotope-enrichment unit according to claim 22 in which the means for withdrawing at least a portion of a product fraction from the light fraction output of the auxiliary cascade includes a second conduit connected between the light-fraction output of the auxiliary cascade and the means for withdrawing product fraction from the first group of cascades for combining the light fraction produced by the auxiliary cascade with a product fraction from the first group of cascades.

24. The isotope-enrichment unit according to claim 19 in which the means for withdrawing gaseous-mixture feedstock from the heavy-fraction output of the auxiliary cascade includes a third conduit connected between the heavy-fraction output of the auxiliary cascade and the means for introducing gaseous-mixture feedstock into the inputs of the first group of cascades for combining the heavy fraction produced by the auxiliary cascade with the gaseous-mixture feedstock supplied to the first group of cascades.

25. A method of substantially continuously separating a supply of a gaseous-mixture feedstock including a compound of a light nuclear isotope at a predetermined concentration and a compound of a heavy nuclear isotope at a predetermined concentration into at least two streams of unit-output fractions including a waste fraction depleted in the light isotope to a predetermined concentration and a product fraction enriched in the light isotope to a predetermined concentration, comprising the steps of:

(a) directing a stream of gaseous-mixture feedstock into each cascade input of a first group of cascades of gas centrifuges to introduce the gaseous-mixture feedstock into the cascades;

(b) centrifugally processing the streams with enriching and stripping stages of the cascades of the first group to separate the supply of gaseous-mixture feedstock into at least one light-fraction stream and at least one heavy-fraction stream;

(c) directing a first stream of gaseous-mixture fraction produced by the first group of cascades into an input of an auxiliary cascade of gas centrifuges to introduce the fraction into the auxiliary cascade;

(d) centrifugally processing the first stream with the auxiliary cascade to separate it into an auxiliary light-fraction stream and an auxiliary heavy-fraction stream, the mole fraction of the light isotope in the auxiliary light fraction being approximately equal to the mole fraction of light isotope in one of a product fraction, a waste fraction, and the gaseous-mixture feedstock, and the mole fraction of the light isotope in the auxiliary heavy fraction being approximately equal to the mole fraction of light isotope in one of a product fraction, a waste fraction, and the gaseous-mixture feedstock;

(e) withdrawing a stream of a unit output fraction at least in part from one of the auxiliary light-fraction stream and the auxiliary heavy-fraction stream;

(f) withdrawing a stream of waste fraction at least in part from at least one of a heavy-fraction stream produced by the first group of cascades, the auxiliary light-fraction stream, and the auxiliary heavy-fraction stream, such stream from which the waste-fraction stream is at least in part withdrawn being depleted in the light isotope to approximately the mole fraction of said waste fraction; and (g) withdrawing a stream of product fraction at least in part from at least one of a light-fraction stream produced by the first group of cascades, the auxiliary light-fraction stream, and the auxiliary heavy-fraction stream, such stream from which the product-fraction stream is at least in part withdrawn being enriched in the light isotope to approximately the mole fraction of said product fraction.

26. The method according to claim 25 in which:

(c.1) said first stream of gaseous-mixture fraction is a light-fraction stream;

(d.1) said mole fractions of the light isotope in the auxiliary light- and heavy-fraction streams are individually approximately equal to the mole fraction of light isotope in one of a product fraction and the gaseous-mixture feedstock;

(e.1) said stream of a unit output fraction is a stream of product fraction; and (f.1) said stream of waste fraction is at least in part withdrawn from a heavy-fraction stream produced by the first group of cascades.

27. The method according to claim 26 in which the gaseous-mixture feedstock is natural-abundance uranium hexafluoride and the product and waste fractions are respectively enriched and depleted in uranium-235.

28. The method according to claim 26 in which the mole fraction of the light isotope in the auxiliary heavy-fraction stream approximately equals the mole fraction of the light isotope in a second light-fraction stream produced by the first group of cascades.

29. The method according to claim 28 further comprising the step of combining the auxiliary heavy-fraction stream with the second light-fraction stream.

30. The method according to claim 26 in which the mole fraction of the light isotope in the auxiliary heavy-fraction stream approximately equals the mole fraction of the light isotope in the stream of gaseous-mixture feedstock.

31. The method according to claim 30 further comprising the step of combining the auxiliary heavy-fraction stream with the stream of gaseous-mixture feedstock.

32. The method according to claim 30 in which the mole fraction of the light isotope in the auxiliary light-fraction stream approximately equals the mole fraction of the light isotope in a second light-fraction stream produced by the first group of cascades.

33. The method according to claim 32 further comprising the step of combining the auxiliary light-fraction stream with the second light-fraction stream.

34. A method of separating a gaseous-mixture feedstock including a compound of a light nuclear isotope at a predetermined concentration and a compound of a heavy nuclear isotope at a predetermined concentration into at least two unit-output fractions including a waste fraction depleted in the light isotope to a predetermined concentration and a product fraction enriched in the light isotope to a predetermined concentration, comprising the steps of:

(a) directing gaseous-mixture feedstock into each cascade input of a first group of cascades of gas centrifuges to introduce the gaseous-mixture feedstock into the cascades;

(b) centrifugally processing the gaseous-mixture feedstock with enriching and stripping stages of the cascades of the first group to separate it into at least one light fraction and at least one heavy fraction;

(c) conveying a first gaseous-mixture fraction produced by the first group of cascades to an input of an auxiliary cascade of gas centrifuges and directing it into the input to introduce the fraction into the auxiliary cascade;

(d) centrifugally processing the first gaseous mixture fraction with the auxiliary cascade to separate it into an auxiliary light fraction and an auxiliary heavy fraction, the mole fraction of the light isotope in a first-auxiliary fraction being approximately equal to the mole fraction of light isotope in the gaseous-mixture feedstock, and the mole fraction of the light isotope in a second auxiliary fraction being approximately equal to the mole fraction of light isotope in a unit-output fraction;

(e) withdrawing at least a portion of a unit output fraction from one of the auxiliary light fraction and the auxiliary heavy fraction;

(f) withdrawing at least a portion of a waste fraction from at least one of a heavy fraction produced by the first group of cascades, the auxiliary light fraction, and the auxiliary heavy fraction, such gaseous-mixture fraction from which the portion of waste fraction is withdrawn being depleted in the light isotope to approximately the mole fraction of said waste fraction; and (g) withdrawing at least a portion of a product fraction from at least one of a light fraction produced by the first group of cascades, the auxiliary light fraction, and the auxiliary heavy fraction, such gaseous-mixture fraction from which the portion of product fraction is withdrawn being enriched in the light isotope to approximately the mole fraction of said product fraction.

35. The method according to claim 34 in which:

(c.1) said first gaseous-mixture fraction is a light fraction;

(d.1) the mole fraction of the light isotope in the auxiliary light fraction is approximately equal to the mole fraction of light isotope in a product fraction, and the mole fraction of the light isotope in the auxiliary heavy fraction is approximately equal to the mole fraction of light isotope in the gaseous mixture feedstock;

(e.1) said unit-output fraction at least a portion of which is withdrawn from one of the auxiliary light and heavy fractions is a product fraction; and (f.1) said portion of a waste fraction is withdrawn from a heavy fraction produced by the first group of cascades.

36. The method according to claim 35 in which the gaseous-mixture feedstock is natural-abundance uranium hexafluoride and the product and waste fractions are respectively enriched and depleted in uranium-235.

37. The method according to claim 34 further comprising the step of combining the auxiliary heavy-fraction with the gaseous-mixture feedstock.

38. The method according to claim 34 in which the mole fraction of the light isotope in the auxiliary light fraction is approximately equal to the mole fraction of the light isotope in a second light fraction produced by the first group of cascades.

39. The method according to claim 38 further comprising the step of combining the auxiliary light fraction with the second light fraction.

40. The method according to claim 34 in which the step of conveying a first gaseous-mixture fraction produced by the first group of cascades to an input of an auxiliary cascade includes the steps of:
 (c.1) collecting a quantity of the first gaseous-mixture fraction in a container, and
 (c.2) discharging the first gaseous-mixture fraction from the container into the input of the auxiliary cascade.

41. The method according to claim 40 in which the step of collecting the first gaseous-mixture fraction includes condensing the first gaseous-mixture fraction in the container in a condensed state, and the step of discharging the first gaseous-mixture fraction includes gasifying the condensed fraction in the container.

42. A method of separating a gaseous-mixture feedstock including a compound of a light nuclear isotope at a predetermined concentration and a compound of a heavy nuclear isotope at a predetermined concentration into at least two unit-output fractions including a waste fraction depleted in the light isotope to a predetermined concentration and a product fraction enriched in the light isotope to a predetermined concentration, comprising the steps of:
 (a) directing gaseous-mixture feedstock into each cascade input of a first group of cascades of gas centrifuges to introduce the gaseous-mixture feedstock into the cascades;
 (b) centrifugally processing the gaseous-mixture feedstock with enriching and stripping stages of the cascades of the first group to separate it into at least one light fraction and at least one heavy fraction;
 (c) conveying a first gaseous-mixture fraction produced by the first group of cascades to an input of an auxiliary cascade of gas centrifuges and directing it into the input to introduce the fraction into the auxiliary cascade;
 (d) centrifugally processing the first gaseous-mixture fraction with the auxiliary cascade to separate it into an auxiliary light fraction and an auxiliary heavy fraction, the mole fraction of the light isotope in the auxiliary light fraction being approximately equal to the mole fraction of light isotope in one of a product fraction, a waste fraction, and the gaseous-mixture feedstock, and being no greater than approximately the mole fraction of the light isotope in the light fraction produced by the first group of cascades having the greatest mole fraction of light isotope and the mole fraction of the light isotope in the auxiliary heavy fraction being approximately equal to the mole fraction of light isotope in one of a product fraction, a waste fraction, and the gaseous mixture feedstock and being no lower than approximately the mole fraction of the light isotope in the heavy fraction produced by the first group of cascades having the least mole fraction of light isotope;
 (e) withdrawing at least a portion of a unit output fraction from one of the auxiliary light fraction and the auxiliary heavy fraction;
 (f) withdrawing at least a portion of a waste fraction from at least one of a heavy fraction produced by the first group of cascades, the auxiliary light fraction, and the auxiliary heavy fraction, such gaseous-mixture fraction from which the portion of waste fraction is withdrawn being depleted in the light isotope to approximately the mole fraction of said waste fraction; and
 (g) withdrawing at least a portion of a product fraction from at least one of a light fraction produced by the first group of cascades, the auxiliary light fraction, and the auxiliary heavy fraction, such gaseous-mixture fraction from which the portion of product fraction is withdrawn being enriched in the light isotope to approximately the mole fraction of said product fraction.

43. The method according to claim 42 in which:
 (c.1) said first gaseous-mixture fraction is a light fraction;
 (d.1) the mole fraction of the light isotope in the auxiliary light fraction is approximately equal to the mole fraction of light isotope in a product fraction, and the mole fraction of the light isotope in the auxiliary heavy fraction is approximately equal to the mole fraction of light isotope in one of a product fraction and the gaseous-mixture feedstock;
 (e.1) said unit-output fraction at least a portion of which is withdrawn from one of the auxiliary light and heavy fractions is a product fraction; and
 (f.1) said portion of a waste fraction is withdrawn from a heavy fraction produced by the first group of cascades.

44. The method according to claim 43 in which the gaseous-mixture feedstock is natural-abundance uranium hexafluoride and the product and waste fractions are respectively enriched and depleted in uranium-235.

45. The method according to claim 43 in which the mole fraction of the light isotope in the auxiliary heavy fraction approximately equals the mole fraction of light isotope in a second light fraction produced by the first group of cascades.

46. The method according to claim 45 further comprising the step of combining the auxiliary heavy fraction with the second light fraction.

47. The method according to claim 45 in which the mole fraction of the light isotope in the auxiliary light fraction approximately equals the mole fraction of the light isotope in a third light fraction produced by the first group of cascades.

48. The method according to claim 47 further comprising the step of combining the auxiliary light fraction with the third light fraction.

49. The method according to claim 42 in which the step of conveying a first gaseous-mixture fraction produced by the first group of cascades to an input of an auxiliary cascade includes the steps of:
 (c.1) collecting a quantity of the first gaseous-mixture fraction in a container; and (c.2) discharging the first gaseous-mixture fraction from the container into the input of the auxiliary cascade.

50. The method according to claim 49 in which the step of collecting the first gaseous-mixture fraction includes condensing the first gaseous-mixture fraction in the container in a condensed state, and the step of discharging the first gaseous-mixture fraction includes gasifying the condensed fraction in the container.

* * * * *

UNITED STATES PATENT AND TRADEMARK OFFICE
CERTIFICATE OF CORRECTION

PATENT NO. : 4,167,244
DATED : September 11, 1979
INVENTOR(S) : THOMAS M. STARK

It is certified that error appears in the above-identified patent and that said Letters Patent are hereby corrected as shown below:

Column 1, line 45, "where uranium" should read -- when uranium --.

Column 2, line 32, "New york" should read -- New York --.

Column 2, line 40, "produces" should read -- produce --.

Column 2, line 42, "0.02-0.35" should read -- 0.2-0.35 --.

Column 2, line 59, "vertical ines" should read -- vertical lines --.

Column 2, line 68, "discharge line 114" should read -- discharge line 144 --.

Column 3, line 4, "feed-stock" should read -- feedstock --.

Column 3, line 61, "otuputs" should read -- outputs --.

Column 3, line 62, "136A-135N" should read -- 136A-136N --.

Column 4, line 28, "than the" should read -- then the --.

Column 8, line 47, "S5" should read -- $\bar{S5}$ --.

Column 10, line 35, "ouputs" should read -- outputs --.

Column 10, line 51, "auxliary" should read -- auxiliary --.

Column 12, line 9, "abudance" should read -- abundance --.

Column 12, line 59, "lightfraction" should read -- light-fraction --.

UNITED STATES PATENT AND TRADEMARK OFFICE
CERTIFICATE OF CORRECTION

PATENT NO. : 4,167,244
DATED : September 11, 1979
INVENTOR(S) : THOMAS M. STARK

It is certified that error appears in the above-identified patent and that said Letters Patent are hereby corrected as shown below:

Column 13, line 23, "disharge" should read -- discharge --.

Column 15, line 14, "heavy fraction" should read -- heavy-fraction --.

Column 15, line 21, "feed-stock" should read -- feedstock --.

Column 16, line 9, "ligh-fraction" should read -- light-fraction --.

Column 16, line 22, "iosotope" should read -- isotope --.

Column 19, lines 4 and 5, "coverting" should read -- converting --.

Column 21, line 68, "on" should read -- one --.

Column 8, line 44 "S$\bar{5}$" should read -- S5 --.

Signed and Sealed this

Eighth Day of January 1980

[SEAL]

Attest:

SIDNEY A. DIAMOND

Attesting Officer  Commissioner of Patents and Trademarks